(12) United States Patent
Ryu et al.

(10) Patent No.: US 10,379,720 B2
(45) Date of Patent: Aug. 13, 2019

(54) FLEXIBLE DISPLAY DEVICE AND OPERATING METHOD THEREOF

(71) Applicant: LG ELECTRONICS INC., Seoul (KR)

(72) Inventors: Eunjeong Ryu, Seoul (KR); Hyunjoo Jeon, Seoul (KR); Youngjun Kim, Seoul (KR); Wonjoo Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 276 days.

(21) Appl. No.: 15/246,341

(22) Filed: Aug. 24, 2016

(65) Prior Publication Data

US 2017/0147189 A1 May 25, 2017

(30) Foreign Application Priority Data

Nov. 24, 2015 (KR) .................. 10-2015-0165072

(51) Int. Cl.
*G06F 3/0484* (2013.01)
*G06F 1/16* (2006.01)
(Continued)

(52) U.S. Cl.
CPC ........ *G06F 3/04845* (2013.01); *G06F 1/1652* (2013.01); *G06F 1/1677* (2013.01);
(Continued)

(58) Field of Classification Search
CPC .. G06F 1/1652; G06F 3/04886; G06F 3/0482; G06F 3/0481; G06F 1/1677;
(Continued)

(56) References Cited

U.S. PATENT DOCUMENTS 9,262,059 B2 * 2/2016 Kim ................. G06F 3/0484
9,928,571 B2 * 3/2018 Chi .................. G06F 1/1652
(Continued)

FOREIGN PATENT DOCUMENTS

EP         2784629          10/2014

OTHER PUBLICATIONS

PCT International Application No. PCT/KR2016/007856, International Search Report dated Nov. 22, 2016, 4 pages.

*Primary Examiner* — Kieu D Vu
*Assistant Examiner* — Alvaro R Calderon, IV
(74) *Attorney, Agent, or Firm* — Lee, Hong, Degerman, Kang & Waimey PC

(57) ABSTRACT

A flexible display device is provided. The flexible display device includes a display extendable from the device; a sensor to detect an extended amount of the display; and a controller configured to cause the display to display a home screen on a pre-extension display region, which is a region of the display that is visible prior to extending of the display; cause the display to display a folder including an application icon corresponding to an application, wherein the folder and the application icon are displayed on the pre-extension display region; detect, via the sensor, extension of the display; and cause the display to display the folder enlarged and the application icon enlarged on an extended display region, which is a region of the display that is visible after extending of the display.

12 Claims, 42 Drawing Sheets

(51) Int. Cl.
*G06F 3/0481* (2013.01)
*G06F 3/0488* (2013.01)
*G09G 5/373* (2006.01)
*G06F 3/0482* (2013.01)
*G06T 13/80* (2011.01)
*G09G 5/38* (2006.01)

(52) U.S. Cl.
CPC ........ *G06F 3/0481* (2013.01); *G06F 3/04817* (2013.01); *G06F 3/04886* (2013.01); *G09G 5/373* (2013.01); *G06F 3/0482* (2013.01); *G06T 13/80* (2013.01); *G09G 5/38* (2013.01); *G09G 2340/045* (2013.01); *G09G 2340/0442* (2013.01); *G09G 2380/02* (2013.01)

(58) Field of Classification Search
CPC ...... G06F 3/04845; G09G 5/373; G09G 5/38; G09G 2380/02; G09G 2340/0442; G09G 2340/045; G06T 13/80
See application file for complete search history.

(56) References Cited

U.S. PATENT DOCUMENTS

| | | | | |
|---|---|---|---|---|
| 2002/0000998 | A1* | 1/2002 | Scott | G06F 17/30274 345/667 |
| 2007/0150834 | A1* | 6/2007 | Muller | G06F 3/04817 715/810 |
| 2010/0053081 | A1* | 3/2010 | Jee | G06F 1/1615 345/157 |
| 2010/0064244 | A1* | 3/2010 | Kilpatrick, II | G06F 1/1616 715/773 |
| 2010/0117975 | A1 | 5/2010 | Cho | |
| 2011/0072394 | A1* | 3/2011 | Victor | G06F 3/0482 715/821 |
| 2011/0163971 | A1* | 7/2011 | Wagner | G06F 3/04817 345/173 |
| 2011/0252346 | A1* | 10/2011 | Chaudhri | G06F 3/04817 715/765 |
| 2011/0314424 | A1* | 12/2011 | Gusmorino | G06F 3/04817 715/846 |
| 2012/0244910 | A1* | 9/2012 | Hsu | G03B 21/10 455/566 |
| 2013/0127918 | A1* | 5/2013 | Kang | G06F 3/0481 345/660 |
| 2013/0275910 | A1* | 10/2013 | Kim | G06F 3/0484 715/800 |
| 2013/0321340 | A1* | 12/2013 | Seo | G06F 1/1641 345/174 |
| 2014/0062976 | A1* | 3/2014 | Park | G09G 5/00 345/204 |
| 2014/0098028 | A1* | 4/2014 | Kwak | G09G 5/00 345/173 |
| 2014/0098075 | A1* | 4/2014 | Kwak | G06F 3/0487 345/204 |
| 2014/0137041 | A1* | 5/2014 | Jeon | G06F 3/0482 715/815 |
| 2014/0218375 | A1* | 8/2014 | Kim | G06F 3/147 345/501 |
| 2014/0325431 | A1* | 10/2014 | Vranjes | G06F 3/0481 715/788 |
| 2015/0012855 | A1* | 1/2015 | Won | G06F 3/0483 715/765 |
| 2015/0220188 | A1* | 8/2015 | Zhao | G09G 3/36 345/174 |
| 2015/0261264 | A1* | 9/2015 | Brown | G06F 3/0221 345/174 |
| 2015/0338888 | A1* | 11/2015 | Kim | G06F 1/1677 345/156 |
| 2015/0378592 | A1* | 12/2015 | Kim | G06F 1/1628 715/765 |
| 2016/0004416 | A1* | 1/2016 | Kim | H04M 1/72563 715/769 |
| 2016/0187994 | A1* | 6/2016 | La | G06F 1/1652 345/619 |
| 2016/0188197 | A1* | 6/2016 | Ryu | G06F 3/04883 345/156 |
| 2016/0284049 | A1* | 9/2016 | Chi | G06F 1/1652 |
| 2017/0061932 | A1* | 3/2017 | Kwon | G06F 3/04817 |
| 2017/0277399 | A1* | 9/2017 | Moon | G06F 3/0488 |

* cited by examiner

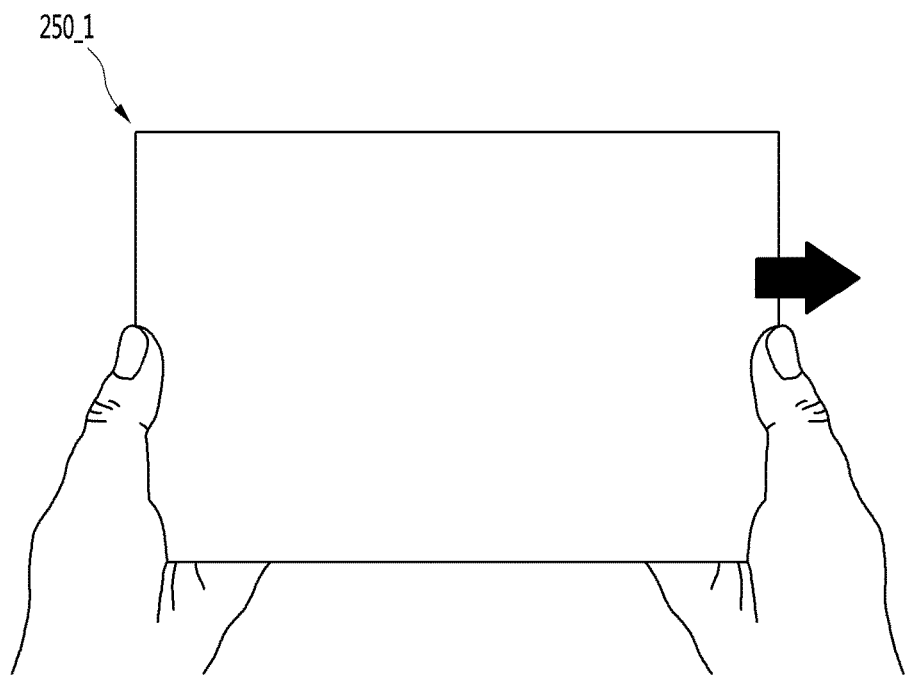
FIG. 2A
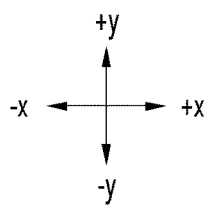

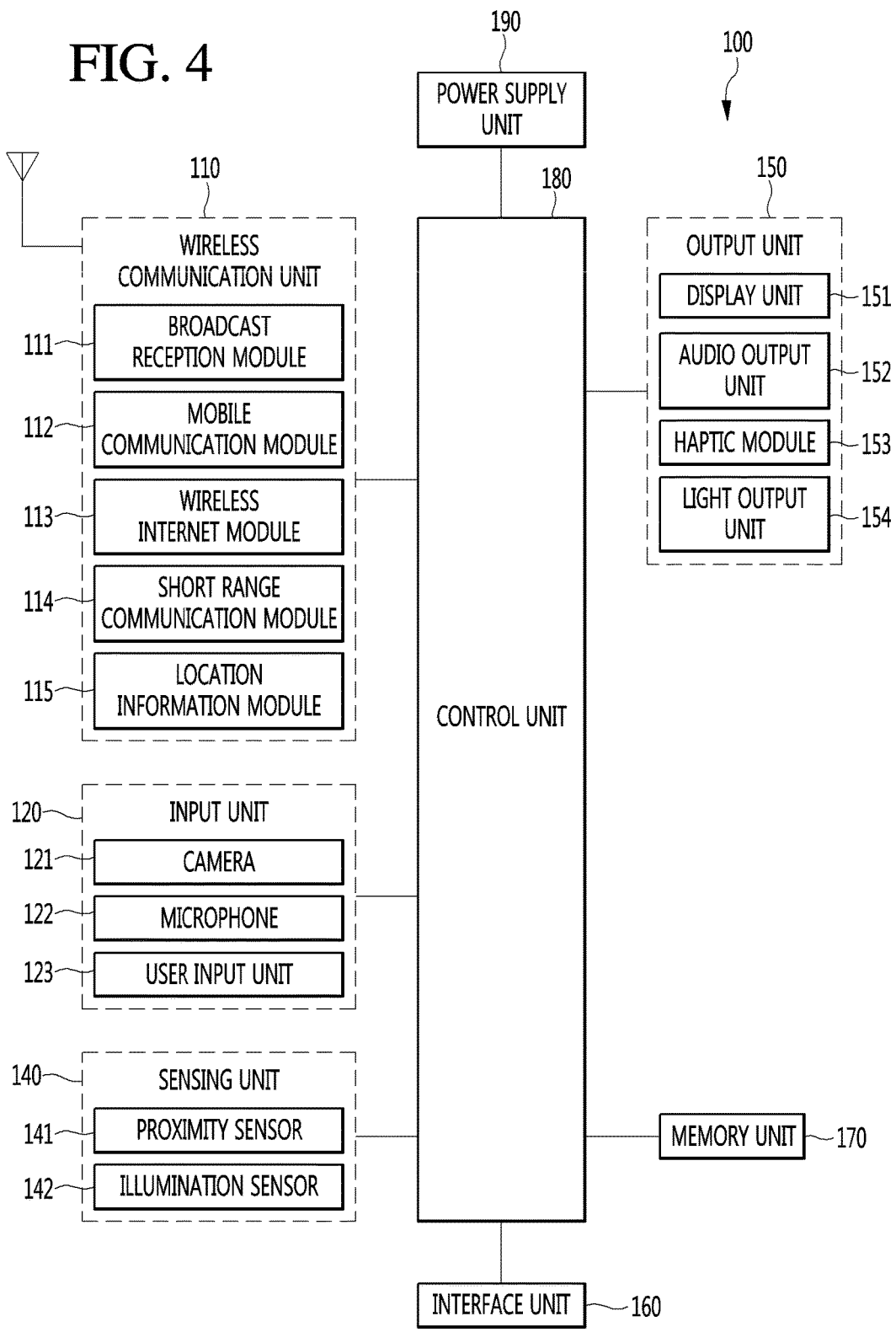

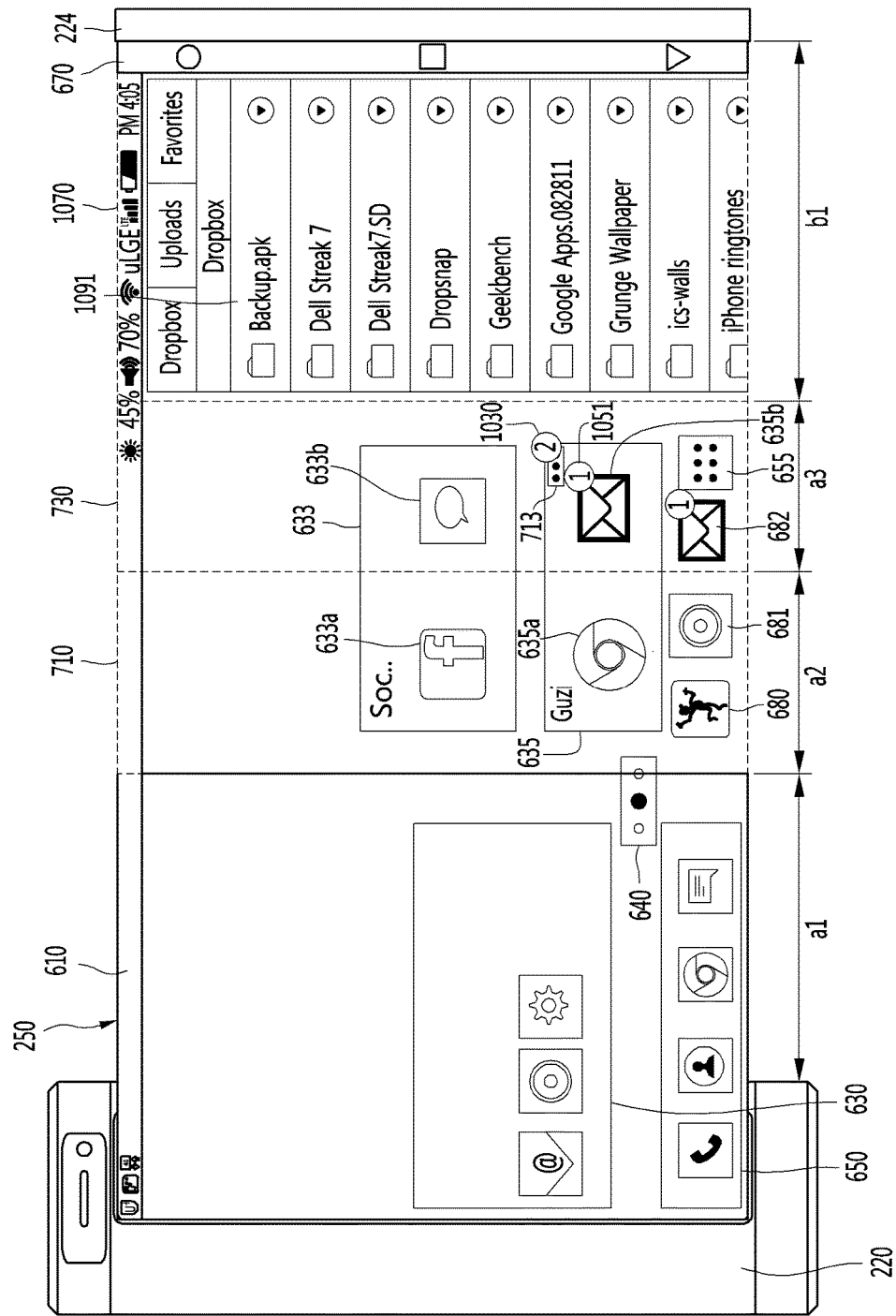

FLEXIBLE DISPLAY DEVICE AND OPERATING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0165072, filed on Nov. 24, 2015, the contents of which are hereby incorporated by reference in its entirety.

BACKGROUND

The present disclosure relates to a flexible display device and a method for operating the same.

With the development of display technology, flexible display devices are being developed that can be rolled or can be stretched in at least one direction during use. Such display devices can be variously changed in shape, and thus can satisfy both the requirement of a large-size screen while using the display and the requirement of a compact display size for portability.

A flexible display device can be deformed into not only a predetermined shape but also various shapes depending on a user's intention or an environment in which the display device is used. However, if a display area of the display device is fixed and cannot be varied, convenience in use may be missing.

SUMMARY

Embodiments of the present disclosure provide a flexible display device capable of being extended or reduced by a simple operation according to a request of a user.

Embodiments of the present disclosure provide a flexible display device capable of extending information displayed on a screen of a display unit as the screen is extended.

In one embodiment, a flexible display device may include: a display extendable from the device; a sensor configured to detect an extended amount of the display; and a controller configured to: cause the display to display a home screen on a pre-extension display region, which is a region of the display that is visible prior to extending of the display; cause the display to display a folder comprising an application icon corresponding to an application, wherein the folder and the application icon are displayed on the pre-extension display region; detect, via the sensor, extension of the display; and cause the display to display the folder enlarged and the application icon enlarged on an extended display region, which is a region of the display that is visible after extending of the display.

The controller may be further configured to cause the display to display the enlarged folder and the enlarged application icon on the extended display region according to at least a position of the folder on the home screen and a number of times the application has been executed.

In another embodiment, the home screen may include a plurality of folders; and the controller may be further configured to cause the display to display on the extended display region a folder corresponding to an application most frequently executed during a particular time period among applications associated with the plurality of folders; and an application icon corresponding to the most frequently executed application.

The home screen can include a first folder and a second folder arranged in a first row and a third folder arranged in a second row; and the controller may be further configured to cause the display to display: a first extended folder comprising an application icon corresponding to an application most frequently executed during a particular time period among the applications of the first and second folders, wherein the first extended folder is displayed in a first row of the extended display region; a second extended folder and an application icon corresponding to an application most frequently executed during the particular time period among applications of the third folder, wherein the second extended folder is displayed in a second row of the extended display region.

The controller may be further configured to cause the display to cease displaying the folder and the application icon on the home screen when the enlarged folder and the enlarged application icon are displayed on the extended display region.

The controller may be further configured to cause the display to display an animation effect of moving the folder to the extended display region while enlarging the folder as the display is extended.

In one embodiment, the home screen may include a plurality of folders; and the controller may be further configured to cause the display to: display all of the plurality of folders on the extended display region when the display is extended to a first extended amount; and move one of the plurality of folders to its original position on the home screen when the display is further extended to a second extended amount from the first extended amount.

In an embodiment, the controller may be further configured to cause the display to display application icons included in one folder of the plurality of folders as the display is extended when only the one folder remains on the extended display region.

Further in one embodiment, the controller may be further configured to cause the display to display: a badge indicating that the application included in the folder has received a notification; a badge on the enlarged folder in the extended display region when the application corresponding to the enlarged application icon has not received a notification; and a badge on the enlarged application icon in the extended display region when the application corresponding to the enlarged application icon has received a notification.

The may be further configured to cause the display to display an execution screen of an application on an additional extended display region when the display is further extended, wherein the application of the execution screen is an application that has most recently received a notification.

In the case where the screen is maximally extended, the controller may be further configured to cause the display to move displayed execution screens of applications that have received notifications to one region of the extended display region where the display is maximally extended.

In one embodiment, the controller may be further configured to cause the display to display: a key input region on the home screen; the enlarged folder and the enlarged application icon on the extended display region as the display is extended while the key input region is selected.

The controller may be further configured to cause the display to display, at a lower end of the extended display region, an application icon corresponding to a recently executed application when the display is extended.

In an embodiment, the controller may be further configured to cause the display to display: a widget on the home screen comprising information; and additional information included in the widget on the extended display region when the display is extended.

In another embodiment, the controller may be further configured to cause the display to display: a status bar comprising information related to an operational state of the flexible display device at an upper end of the home screen; and additional information included in the status bar on the extended display region as the display is extended.

The details of one or more embodiments are set forth in the accompanying drawings and the description below. Other features will be apparent to those of ordinary skill in the art from the description and drawings, and from the claims.

BRIEF DESCRIPTION OF THE DRAWINGS

FIGS. 2A and 2B illustrate exemplary use of a stretchable display device according to an embodiment of the present disclosure.

FIG. 4 is a block diagram of a mobile terminal according to an embodiment of the present disclosure.

FIGS. 10A, 10B, 10C, 10D, 10E, 10F, and 10G are diagrams illustrating another example in which information included in a home screen is extended as a screen size of a display unit increases.

DETAILED DESCRIPTION OF THE EMBODIMENTS

Figure 1A:
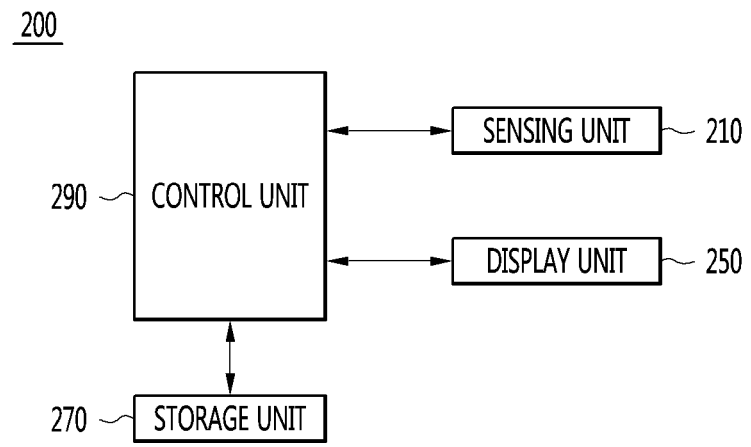
FIG. 1A is a block diagram illustrating a flexible display device according to an embodiment of the present disclosure.

Embodiments of the present disclosure will be described in detail with reference to the accompanying drawings. Like reference numerals refer to like elements throughout, and overlapping descriptions are avoided. In the following description, the terms "module" and "unit" for referring to elements are given or used interchangeably in consideration of ease of description, and thus, the terms per se do not necessarily indicate different meanings or functions. Detailed descriptions of the related art are not provided so that the gist of the embodiments is not unnecessarily obscured. Furthermore, the accompanying drawings are provided only to assist with an understanding of the embodiments of the present disclosure and are not intended to limit the technical concept of the present disclosure, and should be construed as covering all modifications, equivalents or alternatives that fall within the spirit and technical scope of the present disclosure.

The term "first", "second" or the like can be used for describing various elements but does not limit the elements. Such terms are only used for distinguishing one element from other elements.

It will be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

The terms of a singular form can include plural forms unless otherwise specified.

It will be further understood that the terms "comprise", "comprising,", "include", "including", "have" and/or "having", when used herein, specify the presence of stated features, numbers, steps, operations, elements, components or combinations thereof, but do not preclude the presence or addition of one or more other features, numbers, steps, operations, elements, components or combinations thereof.

Figure 1B:
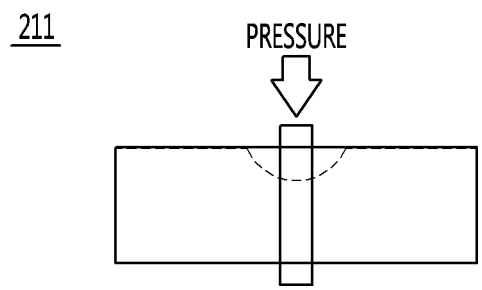
FIG. 1B is a diagram of a pressure sensor of a sensing unit according to an embodiment of the present disclosure.
Figure 1C:
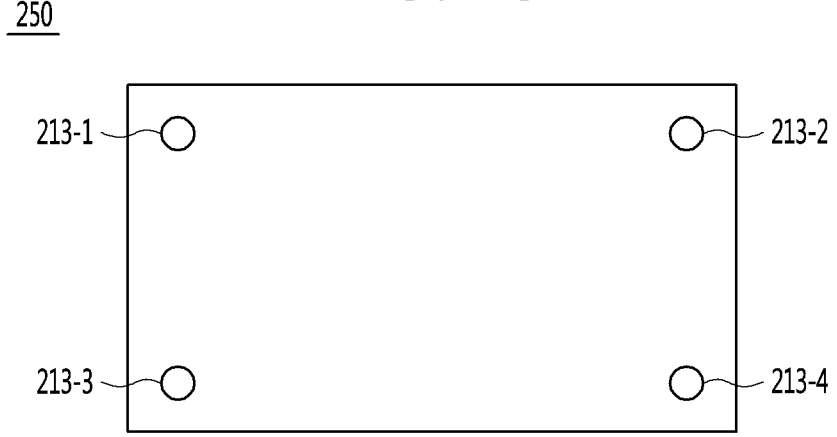
FIG. 1C is a diagram illustrating a display unit in which the sensing unit includes a plurality of acceleration sensors according to an embodiment of the present disclosure.

FIGS. 1A to 1C are diagrams illustrating a flexible display device according to an embodiment.

FIG. 1A is a block diagram illustrating a flexible display device 200 according to an embodiment, FIG. 1B is a diagram for describing a pressure sensor 211 of a sensing unit 210, and FIG. 1C is a diagram illustrating a display unit 250 in which the sensing unit 210 includes a plurality of acceleration sensors 213-1 to 213-4.

The flexible display device 200 according to an embodiment is a next-generation display device that is not only bendable but also stretchable and can be implemented in various and new environments, compared to typical display devices implemented using a rigid material such as glass, silicon, or the like.

In one embodiment, the flexible display device 200 can be a stretchable display device that is stretched when being pulled and recovers its original form when being released. If a certain period of time elapses while the flexible display device is being pulled and stretched, the flexible display device can be fixed in a stretched state. When a force is applied to the flexible display device, the flexible display device can contract to recover its original form.

In another embodiment, the flexible display device 200 can be a rollable display device that is able to be rolled or unrolled like paper.

Referring to FIG. 1A, the flexible display device 200 can include the sensing unit 210, the display unit 250, a storage unit 270, and a control unit 290.

The sensing unit 210 can detect extension or reduction of the display unit 250. The sensing unit 210 can detect a direction or strength of a force applied to the display unit 250.

In one embodiment, the sensing unit 210 can include at least one pressure sensor. The at least one pressure sensor can be disposed at the display unit 250. In the case where the sensing unit 210 includes at least one pressure sensor, each pressure sensor 211 can detect a change in resistance or capacitance between both ends of an area to which a pressure (or force) is applied as illustrated in FIG. 1B. The pressure sensor 211 can transfer, to the control unit 290, at least one of a capacitance change signal indicating a detected capacitance change or a resistance change signal indicating a detected resistance change. The capacitance change signal or the resistance change signal can include information on at least one of the strength or the direction of the force applied to the pressure sensor 211. The control unit 290 can obtain at least one of the strength or the direction of the force applied to the display unit 250, using the capacitance change signal or the resistance change signal received from the pressure sensor 211.

In another embodiment, the sensing unit 210 can include the plurality of acceleration sensors 213-1 to 213-4 as illustrated in FIG. 1C. In the case where the display unit 250 has a rectangular shape, each acceleration shape can be disposed adjacent to a vertex of a rectangle. In the case where the display unit 250 includes a flexible substrate and an image display unit, the acceleration sensors 213-1 to 213-4 can be arranged under the flexible substrate, and the image display unit can be disposed on the flexible substrate. However, this arrangement is merely an example, and the acceleration sensors 213-1 to 213-4 can be embedded in the flexible substrate or the image display unit.

The acceleration sensor serves to detect an intensity of impact or an acceleration of an object. A motion state of the display unit 250 can be accurately detected using the acceleration sensor. The acceleration sensor can sense the acceleration of the display unit 250 in three axial (x-axis, y-axis, z-axis) directions perpendicular to each other. The control unit 290 can obtain a moving speed using a tri-axial acceleration measured by the acceleration sensor. The control unit 290 can obtain a tri-axially extended distance of the display unit 250 using the obtained moving speed. The control unit 290 can obtain the strength and the direction of the force applied to the display unit 250, using the moving speed and distance obtained using the acceleration sensor. The control unit 290 can extend the display unit 250 according to the direction and the strength of the force.

In another embodiment, the sensing unit 210 can include a plurality of hall sensors. The plurality of hall sensors can be arranged inside the display unit 250 or on the display unit 250. In the case where the sensing unit 210 includes the plurality of hall sensors, the control unit 290 can extend or reduce the display unit 250 using voltage sensed by the hall sensors.

In the case where the sensing unit 210 includes the hall sensors, an embodiment in which extension or reduction of the display unit 250 is detected using the hall sensors will be described with reference to FIGS. 3A to 3F.

The display unit 250 can be stretched in at least one direction. The display unit 250 can include a flexible substrate and an image display unit. The flexible substrate can be formed of polydimethylsiloxane (PDMS) and can be extended by a pulling force. The image display unit can be disposed on the flexible substrate, and can be extended together with the flexible substrate. The image display unit can display an image.

The display unit 250 can include an organic light-emitting diode (OLED).

The storage unit 270 can store a strength of a force applied to the display unit 250 and an extension degree or a reduction degree of the display unit 250 which corresponds to the strength of the force. The extension degree of the display unit 250 can indicate an extended length of the display unit 250, and the reduction degree of the display unit 250 can indicate a reduced length of the display unit 250.

The control unit 290 can detect extension or reduction of the display unit 250 via the sensing unit 210. The extension of the display unit 250 can indicate that a size of a screen able to be displayed by the display unit 250 is increased, and the reduction of the display unit 250 can indicate that the size of the screen able to be displayed by the display unit 250 is decreased. The control unit 290 can change a graphic or an image displayed on the screen according to the increase or decrease in the size of the screen of the display unit 250.

Furthermore, the control unit 290 can control overall operation of the flexible display device 200. Operation of the control unit 290 will be described in more detail later.

Figure 2B:
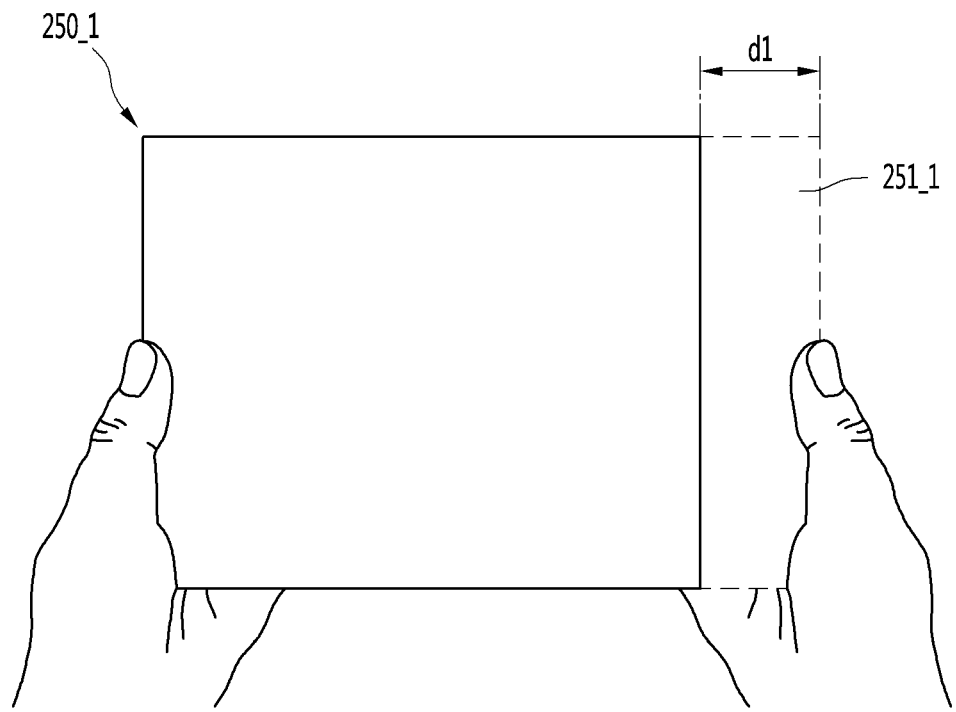

FIGS. 2A and 2B illustrate exemplary use of a stretchable display device that is a type of a flexible display device.

FIG. 2A illustrates a state of a display unit 250_1 before a stretchable display unit 200_1 is stretched. In this state, when a force is applied to the display unit 250_1 in a +x-axis direction, the control unit 290 can extend the display unit 250_1 by a distance of d1 in the +x-axis direction as illustrated in FIG. 2B. As the display unit 250_1 is extended, the display unit 250 can be extended by as much as an extended area 251_1 corresponding to the extended distance d1. That is, the screen size of the display unit 250 can be increased by as much as the extended area 251_1. FIG. 2 illustrates that the force is applied in the +x-axis direction, but this is merely an example. In the case where a force is applied to the display unit 250_1 in a -x-axis direction, the control unit 290 can allow the display unit 250_1 to recover its original size.

FIGS. 3A to 3F are diagrams illustrating a configuration and operation of a rollable display device which is a type of a flexible display device according to an embodiment.

Figure 3A:
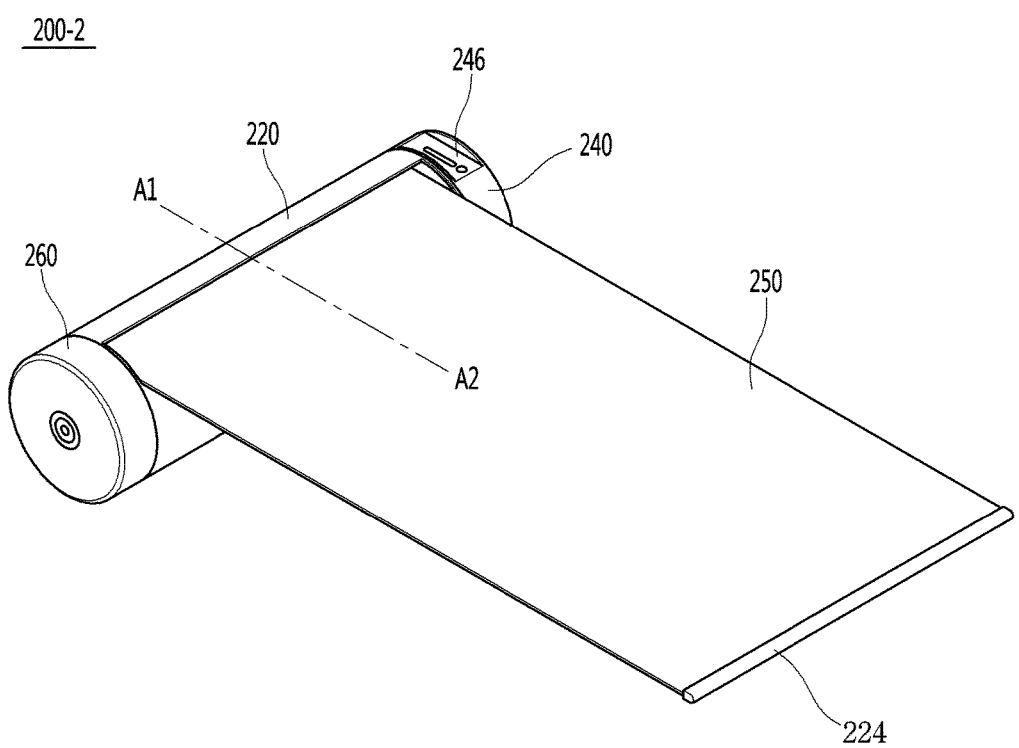
FIGS. 3A, 3B, 3C, 3D, 3E, and 3F are diagrams illustrating a configuration and operation of a rollable display device according to an embodiment of the present disclosure.
Figure 3B:
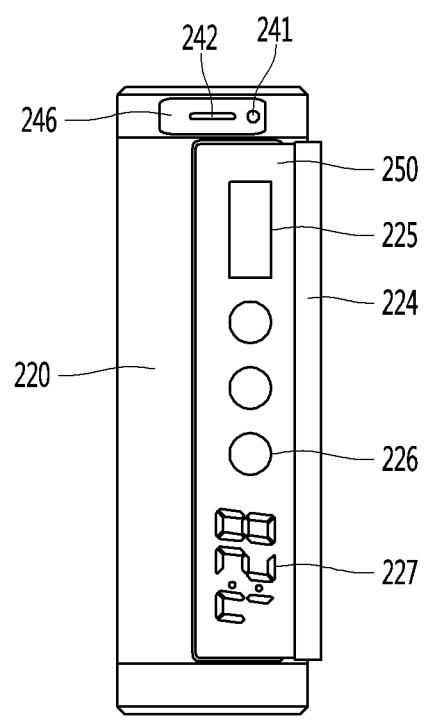
Figure 3C:
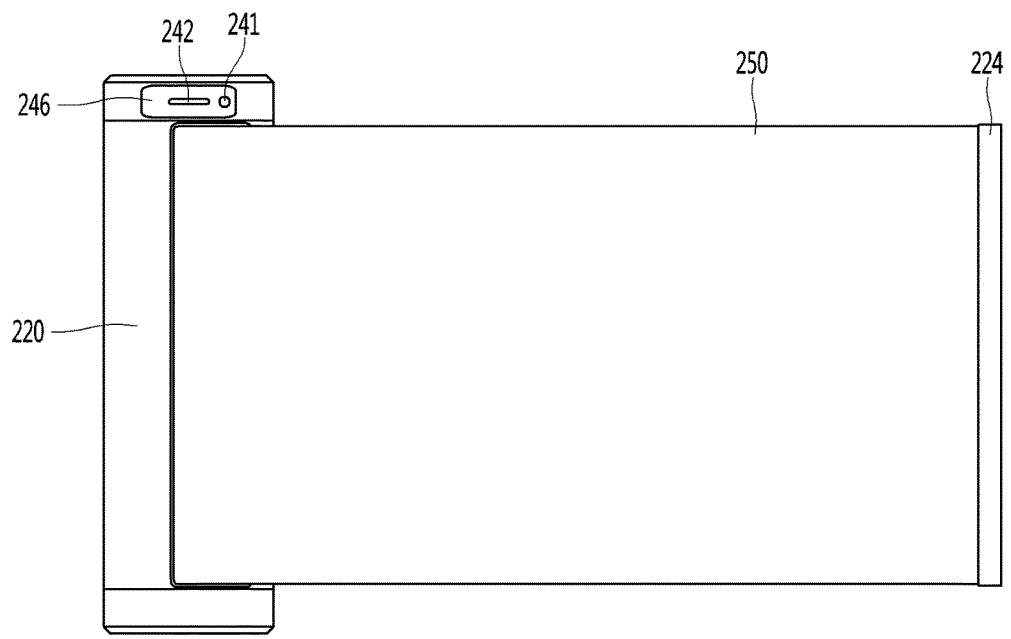
Figure 3D:
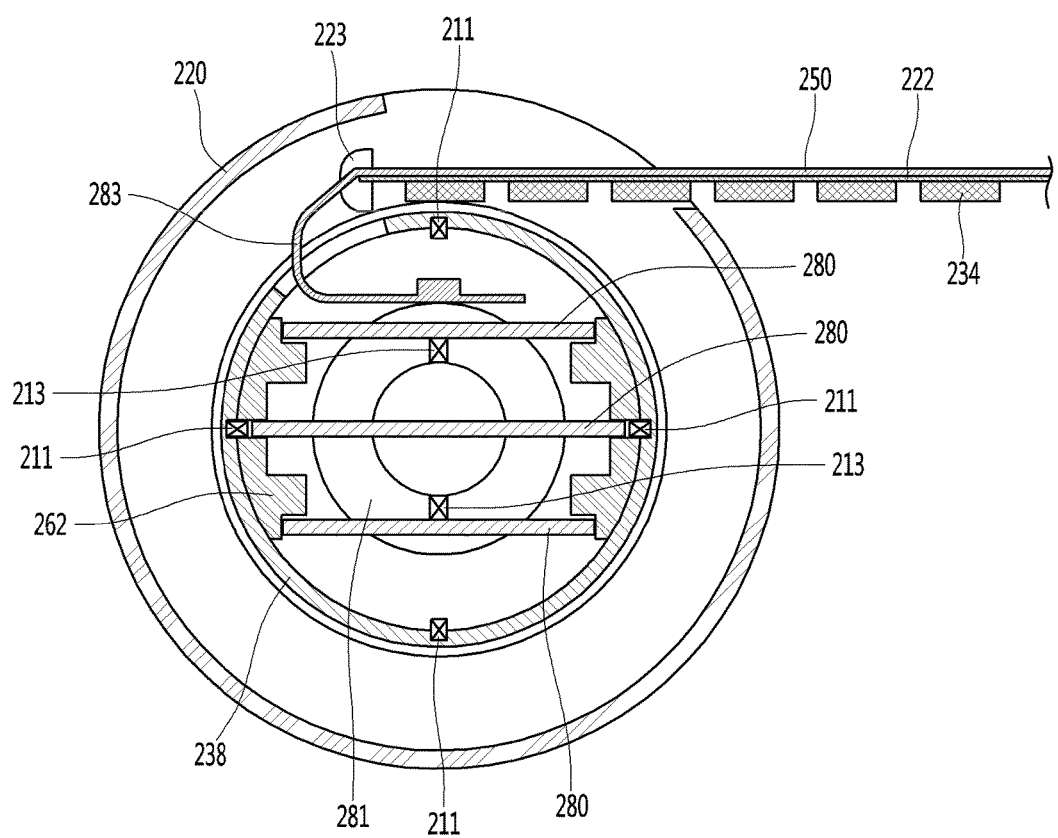
Figure 3E:
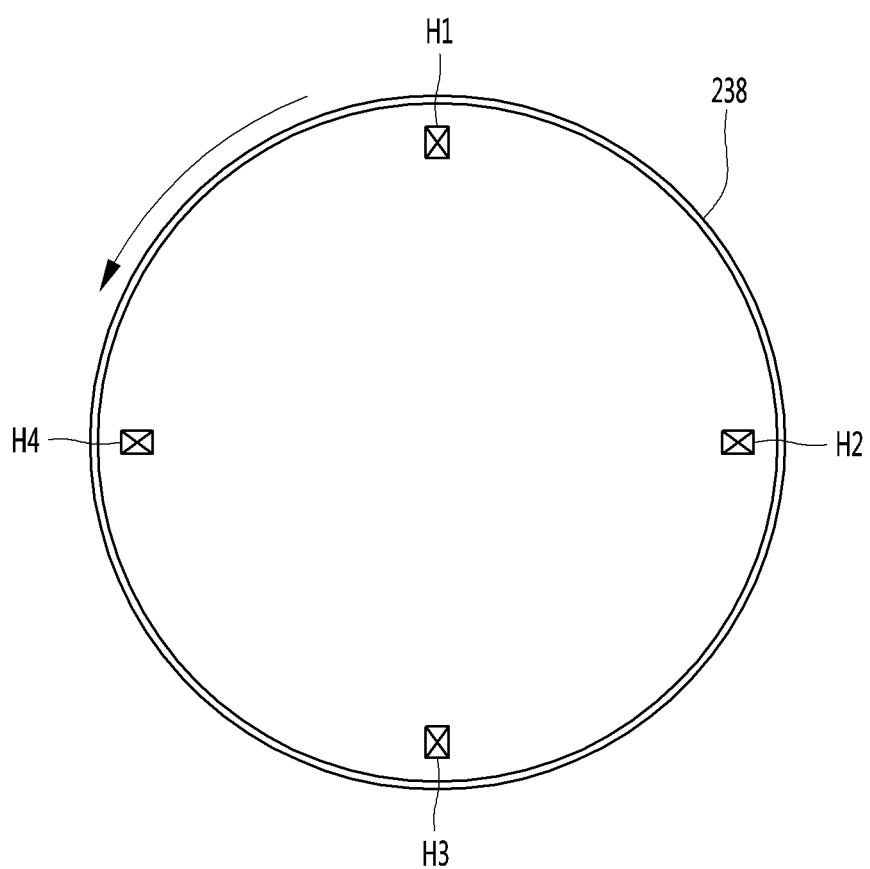
Figure 3F:
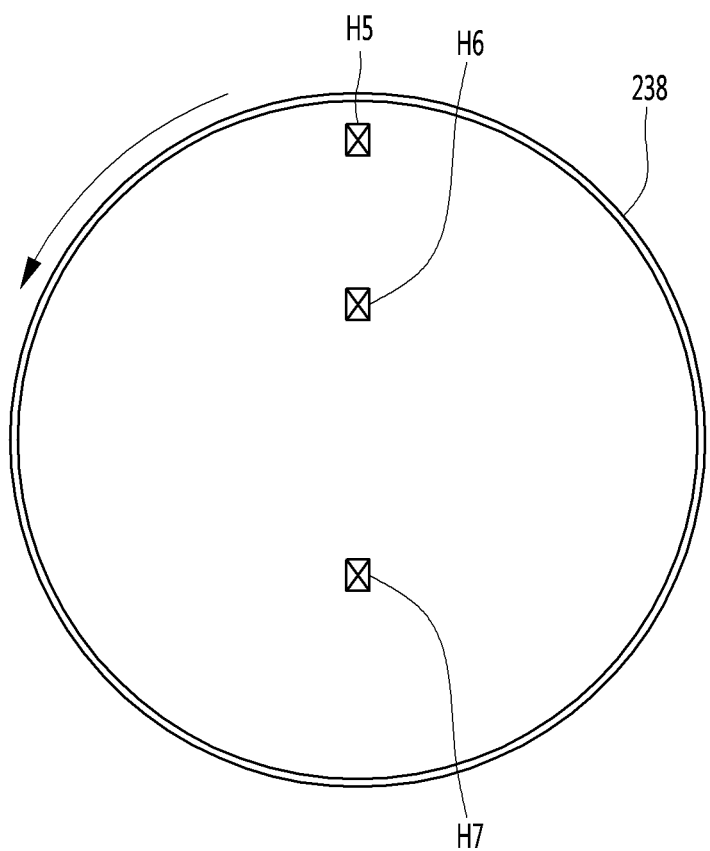

FIG. 3A is a perspective view of the rollable display device according to an embodiment, FIG. 3B is a diagram illustrating the rollable display device that is in a first operation state according to an embodiment, FIG. 3C is a diagram illustrating the rollable display device that is in a second operation state according to an embodiment, FIG. 3D is a cross-sectional view of the rollable display device taken along line A1-A2 of FIG. 3A, and FIGS. 3E and 3F are diagrams illustrating a process of sensing a spread length, a rolled length, or a rotation amount of a display unit using a hall sensor according to an embodiment.

Referring to FIGS. 3A to 3D, a rollable display device 200-2 can include an upper case 240, an intermediate case 220, a lower case 260, a display unit 250, a first holder 223, and a second holder 224.

The upper case 240, the lower case 260, and the intermediate case 220 form an exterior of the rollable display device 200-2. The intermediate case 220 can have a cylindrical shape, but is not limited thereto and can have various shapes such as a hexahedral shape. As illustrated in FIG. 3D, a part of the intermediate case 220 can be opened so as to expose a part of the display unit 250.

The upper case 240 and the lower case 260 can cover the intermediate case 220 at an upper side and a lower side thereof. The upper case 240 and the lower case 260 may not expose various components arranged inside the intermediate case 220. A recess part 246 can be formed in the upper case 240, wherein the recess part 246 can be recessed towards the inside of the upper case 240 so as to have a planar shape. At least one of a camera 241 or a sound output unit 242 can be disposed in the recess part 246. The first holder 223 (see FIG. 3D) can be provided to an end portion of one side of the display unit 250, and the second holder 224 can be provided to an end portion of another side of the display unit 250. The first holder 223 can prevent the display unit 250 from escaping from an inner side of the intermediate case 220 when a screen of the display unit 250 is maximally extended. The second holder 224 can prevent the display unit 250 from being rolled into the inner side of the intermediate case 220. A user can draw the second holder 224 in a specific direction to extend the screen of the display unit 250.

The display unit 250 can be rolled in towards the inner side of the intermediate case 220, or can be rolled out of the intermediate case 220. That is, the display unit 250 can be wound, rolled or coiled into the inner side of the intermediate case 220, or can be unwound, unrolled or uncoiled out of the intermediate case 220.

FIG. 3B is a diagram illustrating the first operation state of the rollable display device 200-2, and FIG. 3C is a diagram illustrating the second operation state of the rollable display device 200-2.

In a state in which the display unit 250 is not deformed (e.g., a state of having an infinite radius of curvature, hereinafter referred to as the first operation state), a region displayed by the display unit 250 can be a plane. In a state in which the display unit 250 is deformed by an external force in the first operation state (e.g., a state of having a finite radius of curvature, hereinafter referred to as the second operation state), a region displayed by the display unit 250 can be a curved surface. As illustrated in the drawings, information displayed in the second operation state can be time information output to the curved surface. Such time information can be implemented by individually controlling light emission of sub-pixels arranged in a matrix.

In the first operation state, the display unit 250 may not be flat but curved (e.g., vertically or horizontally curved). In this case, when an external force is applied to the display unit 250, the display unit 250 can be deformed to be flat (or less curved) or more curved.

The display unit 250 can be combined with a touch sensor to implement a flexible touch screen. When the flexible touch screen is touched, a control unit 290 can perform control corresponding to the touch input. The flexible touch screen can detect a touch input not only in the first operation state but also in the second operation state.

The rollable display device 200-2 according to an embodiment can be provided with a deformation detecting unit for detecting deformation of the display unit 250. The deformation detecting unit can be included in the sensing unit 210 (see FIG. 1A).

The deformation detecting unit can be provided to the display unit 250 or the intermediate case 220 so as to detect information on deformation of the display unit 250. Here, the information on deformation can include a deformation direction, a deformation degree, a deformation portion, or a deformation time of the display unit 250 or an acceleration of recovery of the display unit 250 deformed, or can additionally include various information detectable due to warpage of the display unit 250.

Furthermore, the control unit 290 can change information displayed on the display unit 250 or can generate a control signal for controlling a function of the rollable display device 200-2, on the basis of the information on deformation of the display unit 250 detected by the deformation detecting unit.

In an embodiment, the first operation state of the rollable display device 200-2 represents an inactive state in which a minimum display region is externally exposed so that basic information alone is displayed. The second operation state of the rollable display device 200-2 represents an active state in which the display unit 250 is extended. Extending of the display unit 250 can indicate that a screen displayed by the display unit 250 is extended or externally exposed. This extending includes gradational extending. A display region of the rollable display device 200-2, which is extended or reduced by rolling the display unit 250, can be implemented at one time at the moment of the extending or reducing, or the display region can be gradually extended or reduced. Therefore, hereinafter all states excepting the first operation state can be regarded as the second operation state, and the second operation state can be classified into a plurality of stages according to a degree of extension.

As illustrated in FIG. 3B, only regions such as a message window 225, an icon 226, or a time display part 227 can be displayed to minimize an exposed region of the display unit 250 in the first operation state. However, in the second operation state, the exposed region of the display unit 250 can be maximized to display information on a larger screen as illustrated in FIG. 3C. It is assumed that FIG. 3C illustrates a state in which the display unit 250 is maximally extended in some cases.

The control unit 290 (see FIG. 1A) can detect an unwound length of the display unit 250, and can turn on/off a part of the display unit 250 on the basis of the unwound length. For example, the control unit 290 can obtain a length of the display unit 250 unwound out of an opened region of the intermediate case 220. The control unit 290 can turn off the display unit 250 disposed inside the intermediate case 220, and can turn on the display unit 250 unwound out of the opened region of the intermediate case 220. Turning on a part of the display unit 250 can represent that power is applied so that the part of the display unit 250 displays information, and turning off a part of the display unit 250 can represent that power is not applied so that the part of the display unit 250 does not display information. Accordingly, since a part of the display unit 250 which is not unwound out of the intermediate case 220 is turned off, unnecessary power consumption and heating can be prevented.

Furthermore, when the display unit 250 is separated from an outer circumferential surface of an inner case 238, the control unit 290 can turn on a separated part of the display unit 250 and can turn off a non-separated part of the display unit 250. The control unit 290 can detect that the display unit 250 is separated from the outer circumferential surface of the inner case 238 using a length sensing unit 211 disposed in an inner circumferential surface of the inner case 238, so as to turn on the separated part of the display unit 250 and turn off the non-separated part of the display unit 250.

Referring to FIG. 3D, a shaft 281, the inner case 238, the length sensing unit 211, a rotation amount sensing unit 213, a plurality of circuit boards 280, a flexible circuit board 283, and a support frame 262 can be arranged in the intermediate case 220.

The shaft 281 can be rotated as the inner case 238 rotates.

The inner case 238 can be shaped like a roller, can be rollable, and can serve to wind or unwind the display unit 250. The inner case 238 is axially connected to the intermediate case 220 so as to be rotatable.

The length sensing unit 211 can sense a wound length or an unwound length of the display unit 250. The length sensing unit 211 can include a magnetic member. The length sensing unit 211 can include at least one hall sensor. The length sensing unit 211 will be described later in more detail.

The rotation amount sensing unit 213 can sense the number of turns of the display unit 250 wound on the inner case 238. That is, the rotation amount sensing unit 213 can sense the number of turns of the display unit 250 wound on the inner case 238 as the display unit 250 is rolled. The rotation amount sensing unit 213 can include a magnetic member. The rotation amount sensing unit 213 can include at least one hall sensor. The rotation amount sensing unit 213 will be described later in more detail.

A plurality of electronic circuit components for operating the rollable display device 200-2 can be mounted on each circuit board 280.

The flexible circuit board 283 can connect electronic circuit components mounted on the inner case 238 to the display unit 250. The electronic circuit component can include at least one of the sensing unit 210, the storage unit 270, or the control unit 290 illustrated in FIG. 1A.

The support frame 262 can support the circuit board 280, and can be disposed in the inner case 238.

The inner case 238 can be rotated by magnetism between the length sensing unit 211 and rolling sensing units 234 spaced apart from each other under the display unit 250. The rolling sensing unit 234 can include a magnetic member, and can include at least one hall sensor. The display unit 250 can be rotated together with the inner case 238 while being rolled on the inner case 238 by the magnetism. In detail, the display unit 250 can be rolled by magnetic attraction between the rolling sensing unit 234 and the length sensing unit 211. For example, in the case where the length sensing unit 211 includes an N-pole magnetic member and the rolling sensing unit 234 includes an S-pole magnetic member, they attract each other. A position of the length sensing unit 211 can be fixed. The rolling sensing unit 234 is attracted towards the length sensing unit 211 while moving linearly, and the rolling sensing units 234 spaced apart from each other are continually introduced into the intermediate case 220. Since the rolling sensing unit 234 that has been already introduced and the length sensing unit 211 continuously attract each other, the rolling sensing unit 234 newly introduced and the length sensing unit 211 maintain a balance in terms of attraction so that the rolling sensing units 234 are rotated around the length sensing units 211. By virtue of this mechanism, the display unit 250 is wound while being rolled.

A sheet 222 provided with the rolling sensing unit 234 can be disposed on a lower surface of the display unit 250. The sheet 222 can be included in the display unit 250, or can be present independently from the display unit 250. The sheet 222 can be flexible. For example, the sheet 222 can be silicone or Thermoplastic Poly Urethane (TPU). The sheet 222 can be bonded to the lower surface of the display unit 250 in the form of a sheet frame, can sequentially fix the rolling sensing units 234, and can be formed through bonding, tape or insert molding. Furthermore, the sheet 222 can be formed of a material that is flexible, has excellent elasticity and elongation, and enables maintenance of a small thickness of the sheet 222. This is intended to allow the rolling sensing units 234 to have the same magnetic pole so that the display unit 250 is spread flat by magnetic repulsion. That is, the rolling sensing units 234 having the same magnetic pole repel each other by a repulsive force so that the display unit 250 is spread flat.

The length sensing unit 211 can sense magnetism between the rolling sensing unit 234 and the length sensing unit 211 to calculate the wound length or the unwound length of the display unit 250. The rotation amount sensing unit 213 can sense the number of turns of the display unit 250 wound on the outer circumferential surface of the inner case 238. This will be described later in more detail with reference to FIGS. 3E and 3F.

Referring to FIG. 3E, the length sensing unit 211 can include four hall sensors H1 to H4. The four hall sensors are arranged on the inner circumferential surface of the inner case 238 or an inner space thereof along a circumferential direction of the inner case 238, while being spaced apart from each other by a fixed distance. Here, first to fourth hall sensors H1 to H4 sense movement of the rolling sensing unit 234 by sensing a change of magnetism in the circumferential direction of the inner case 238.

The arrows of FIGS. 3E and 3F represent a rotation direction of the inner case 238. The first hall sensor H1 alone senses the rolling sensing unit 234 in the second operation state in which the display unit 250 is maximally exposed as the inner case 238 is rotated. Thereafter, when the inner case 238 is rotated counterclockwise, the display unit 250 is wound on the inner case 238, and the second to fourth hall sensors H2 to H4 sequentially sense the rolling sensing unit 234. As described above, the first to fourth hall sensors H1 to H4 provide information for measuring a length of the display unit 250 wound along the outer circumferential surface of the inner case 238. The control unit 290 can detect a sensor that lastly senses the rolling sensing unit 234 when the display unit 250 is wound or unwound. Accordingly, the control unit 290 can calculate the wound length or the unwound length of the display unit 250. This is the same for the case where the display unit 250 is wound on the inner case 238 by multiple turns.

In the case where the display unit 250 is wound on the outer circumferential surface 238 in two or more layers, magnetism is changed in a radial direction of the inner case 238. Therefore, if a hall sensor for sensing the change is provided, the wound length of the display unit 250 can be measured more accurately.

For example, as illustrated in FIG. 3F, if two or more hall sensors are spaced apart from each other by a fixed distance in a radial direction of the inner case 238, a magnetism change of the rolling sensing unit 234 stacked in two or more layers on the outer circumferential surface of the inner case 238 can be sensed, so that the wound length of the display unit 250 can be calculated more accurately. Although FIG. 3F illustrates three hall sensors, i.e., fifth to seventh hall sensors H5 to H7, this is merely an example. That is, the fifth to seventh hall sensors H5 to H7 sense a magnetism change in a radial direction of the inner case 238 due to the rolling sensing unit 234.

In more detail, in the second operation state (i.e., the state illustrated in FIG. 3D), the control unit 290 can calculate the wound length of the display unit 250 using the first to fourth hall sensors H1 to H4 while the display unit 250 is wound in one layer on the inner case 238. In the case where the display unit 250 is wound in two layers on the inner case 238, the fifth to seventh hall sensors H5 to H7 sense a change of magnetism in a radial direction. The control unit 290 can obtain the number of turns of the display unit 250 wound, using the magnetism change sensed by the fifth to seventh hall sensors H5 to H7. A length of the display unit 250 wound thereafter can be calculated using the first to fourth hall sensors H1 to H4, and, when the display unit 250 is stacked in three layers in a radial direction in which the fifth to seventh hall sensors H5 to H7 are arranged, the magnetism change is sensed by the fifth to seventh hall sensors H5 to H7. As described above, the control unit 290 can calculate the length of the display unit 250 wound on the outer circumferential surface of the inner case 238 using the first to fourth hall sensors H1 to H4, and can calculate the number of turns of the display unit 250 wound on the outer circumferential surface of the inner case 283 using the fifth to seventh hall sensors H5 to H7.

According to another embodiment, the rollable display device 200-2 can be additionally provided with the upper case 240, the intermediate case 220, and the lower case 260 at another end portion of the display unit 250. The elements described above with reference to FIG. 3D can be included in the intermediate case 220. Therefore, a user can grip the rollable display device 200-2 with both hands to extend or reduce the display unit 250.

The flexible display device 200 can include all configurations of a mobile terminal 100 described below with reference to FIG. 4.

A mobile terminal included in the flexible display device 200 will be described with reference to FIG. 4.

The mobile terminal described herein can include a cell phone, a smartphone, a laptop computer, a terminal for a digital broadcast, a personal digital assistant (PDA), a portable multimedia player (PMP), a navigator, a slate PC, a tablet PC, an ultrabook, a wearable device (e.g., a smartwatch, smart glasses, or a head mounted display (HMD)), or the like.

However, those skilled in the art would understand that configurations according to the embodiments described herein can also be applied to not only mobile devices but also non-mobile devices such as digital TVs, desktop computers or digital signage.

FIG. 4 is a block diagram for describing a mobile terminal in relation to an embodiment.

The flexible display device 200 can include elements of a mobile terminal 100. In particular, the sensing unit 210 of the flexible display device 200 can perform a function of a sensing unit 140 of the mobile terminal 100, the display unit 250 can perform a function of a display unit 151 of the mobile terminal 100, and the storage unit 270 can perform a function of a memory 170 of the mobile terminal 100.

The mobile terminal 100 can include a wireless communication unit 110, an input unit 120, a sensing unit 140, an output unit 150, an interface unit 160, a memory unit 170, a control unit 180, and a power supply unit 190. Since the elements illustrated in FIG. 4 are not essential for realizing a mobile terminal, a mobile terminal to be described herein can include more or fewer elements than the above-described.

In detail, the wireless communication unit 110 among the elements can include one or more modules enabling wireless communication between the mobile terminal 100 and another mobile terminal 100, or between the mobile terminal 100 and an external server. In addition, the wireless communication 110 can include one or more modules connecting the mobile terminal 100 to one or more networks.

The wireless communication unit 110 can include at least one of a broadcast reception module 111, a mobile communication module 112, a wireless internet module 113, a short range communication module 114, and a location information module 115.

The input unit 130 can include a camera 121 or an image input unit for an image signal input, a microphone 122 or an audio input unit for an audio signal input, a user input unit 123 (e.g., a touch key, a mechanical key, etc.) for receiving information from a user. Voice data or image data collected by the input unit 120 can be analyzed and processed with user's control commands.

The sensing unit 140 can include at least one sensor for sensing at least one of surrounding environment information around the mobile terminal and user information. For example, the sensing unit 140 can include at least one selected from a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (e.g., the camera (see 121)), a microphone (see 122), a battery gauge, an environmental sensor(e.g., a barometer, a hygrometer, a thermometer, a radiation sensor, a thermal sensor, a gas detection sensor, etc.), a chemical sensor(e.g., an e-nose, a healthcare sensor, a biometric sensor, etc.). Furthermore, the mobile terminal disclosed herein can combine and use information sensed by at least two sensors among those sensors.

The output unit 150 is for generating an output related to sense of sight, sense of hearing, or sense of touch, and can include at least one selected from a display unit 151, an audio output unit 152, a haptic module 153, and a light output unit 154. The display unit 151 can form a mutually layered structure with or be formed into one with a touch sensor, and realize a touch screen. Such a touch screen can not only function as the user input unit 123 providing an input interface between the mobile terminal 100 and the user, but also provide an output interface between the mobile terminal 100 and the user.

The interface unit 160 plays a role of a passage with various kinds of external devices connected to the mobile terminal 100. This interface unit 160 can include at least one selected from a wired/wireless headset port, an external charger port, a wired/wireless data port, a memory card port, a port connecting a device having an identification module prepared therein, an audio input/output (I/O) port, a video input/output (I/O) port, and an earphone port. In the mobile terminal 100, a proper control can be performed on a connected external device in correspondence to connection between the external device and the interface unit 160.

In addition, the memory 170 stores data for supporting various functions of the mobile terminal 100. The memory 170 can store a plurality of application programs or applications driven in the mobile terminal 100, data for operations of the mobile terminal 100, and instructions. At least a part of these application programs can exist in the mobile terminal 100 at the time of release for basic functions (e.g., a call originating or receiving function, a message transmitting and receiving function). Moreover, the application programs are stored in the memory 170 and installed in the mobile terminal 100, and then can be driven to perform operations (or functions) of the mobile terminal by the control unit 180.

The control unit 180 typically controls overall operations of the mobile terminal 100 besides operations related to the application programs. The control unit 180 can provide the user with, or process proper information or functions by processing a signal, data, or information input or output through the above-described elements, or driving the application programs stored in the memory 170.

In addition, the control unit 180 can control at least a part of the elements illustrated in FIG. 4 so as to drive the application programs stored in the memory 170. Furthermore, the control unit 180 can combine at least two elements among the elements included in the mobile terminal 100 and operate the combined.

The power supply unit 190 receives internal or external power under a control of the control unit 180 and supplies the power to each element included in the mobile terminal 100. The power supply unit 190 includes a battery and the battery can be an embedded type battery or a replaceable battery.

At least a part of the elements can operate in cooperation with each other for realizing an operation, control, or control method of the mobile terminal according to various embodiments. In addition, the operation, control, or control method of the mobile terminal can be realized in the mobile terminal by driving at least one application program stored in the memory 170.

Hereinafter, the above-described elements are described in detail with reference to FIG. 4 before describing various embodiments realized through the mobile terminal 100.

Firstly, in the wireless communication unit 110, the broadcast reception module 111 receives a broadcast signal and/or broadcast related information from an external broadcast management server through a broadcast channel. The broadcast channel can include a satellite channel or a terrestrial channel. Two or more broadcast reception modules can be provided to the mobile terminal 100 for simultaneous broadcast reception or broadcast channel switching for at least two broadcast channels.

The mobile communication module 112 can transmit and receive wireless signals to and from at least one selected from a base station, an external terminal, and a server on a mobile communication network constructed according to technical standards or communication schemes for the mobile communication (e.g., Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A) etc.).

The wireless signal can include a voice call signal, a video call signal, or various types of data according to transmission and reception of a text/multimedia message.

The wireless internet module 113 refers to a module for a wireless internet connection, and can be embedded in or prepared outside the mobile terminal 100. The wireless internet module 113 is configured to transmit and receive a wireless signal over a communication network conforming with wireless internet technologies.

The wireless internet technologies include, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and LTE-Advanced (LTE-A), and the wireless internet module 113 transmits and receives data according to at least one wireless internet technology within the range of including internet technology not described in the above.

From a viewpoint that an access to the wireless internet through WiBro, HSDPA, HSUPA, GSM, CDMA, WCDMA, LTE, or LTE-A is conducted through a mobile communication network, the wireless internet module 113 conducting the access to the wireless internet through the mobile communication network can be understood as a kind of the mobile communication module 112.

The short range communication module 114 is for short range communication and can support the short range communication by using at least one selected from Bluetooth™, Radio Frequency Identification (RFID), Infrared Data Association (IrDA), Ultra Wideband UWB), ZigBee, Near Field Communication (NFC), Wi-Fi, Wi-Fi Direct, and Wireless Universal Serial Bus (Wireless USB) technologies. This short range communication module 114 can support, through a wireless area network, wireless communication between the mobile communication terminal 100 and a wireless communication system, between the mobile terminal 100 and another mobile terminal 100, or between the mobile terminal 100 and a network on which the other mobile terminal 100 or an external server is located. The wireless area network can be a wireless personal area network.

Here, the other mobile terminal 100 can be a wearable device (e.g., a smart watch, a smart glass, or an HMD) through which data is mutually exchangeable (or interworkable) with the mobile terminal 100 according to an embodiment. The short range communication module 114 can detect (or recognize) a wearable device capable of communicating with the mobile terminal 100. Furthermore, when the detected wearable device is authenticated to communicate with the mobile terminal 100, the control unit 180 can transmit at least a part of data processed in the mobile terminal 100 to the wearable device through the short range communication module 114. Therefore, a user of the wearable device can use the data processed by the mobile terminal 100 through the wearable device. For example, when a call is received by the mobile terminal 100, the user can perform a phone call through the wearable device, or when a message is received by the mobile terminal 100, the user can check the received message through the wearable device.

The location information module 115 is for obtaining a location (or a current location) of the mobile terminal. As a representative example thereof, there is a global positioning system (GPS) module or a Wi-Fi module. For example, when adopting the GPS module, the mobile terminal can obtain a location of the mobile terminal by using a signal transmitted from a GPS satellite. For another example, when adopting the Wi-Fi module, the mobile terminal can obtain the location of the mobile terminal on the basis of information on a wireless access point (AP) transmitting or receiving a wireless signal with the Wi-Fi module. If necessary, the location information module 115 can additionally or alternatively perform any one function among other modules in the wireless communication unit 110 in order to obtain data about the location of the mobile terminal. The location information module 115 is a module used for obtaining the location (or current location) of the mobile terminal, and is not limited to a module directly calculating or obtaining the location of the mobile terminal.

Next, the input unit 120 is for receiving image information (or an image signal), audio information (or an audio signal), data, or information input from the user. The mobile terminal 100 can include one or a plurality of cameras 121 for an input of image information. The camera 121 processes an image frame such as a still image or video obtained by an image sensor in a video call mode or an image capturing mode. The processed image frame can be displayed on the display unit 151 or stored in the memory 170. Furthermore, the plurality of cameras 121 prepared in the mobile terminal 100 can be arranged to form a matrix structure, and, through the cameras 121 forming this matrix structure, a plurality of pieces of information on images having different angles or different focuses can be input to the mobile terminal 100. In addition, the plurality of cameras 121 can be arranged in a stereo structure to obtain left and right images for realizing a stereoscopic image.

The microphone 122 can process an external sound signal as electrical voice data. The processed voice data can be variously used according to a function (or an application program) being performed in the mobile terminal 100. Furthermore, various noise removal algorithms can be implemented for removing noise generated in a process for receiving the external sound signal.

The user input unit 123 is for receiving information from the user. When information is input through the user input unit 123, the control unit 180 can control an operation of the mobile terminal 100 in correspondence to the input information. This user input unit 123 can include a mechanical input unit (or mechanical key, for example, buttons positioned on the front and rear surfaces or on the side surfaces, a dome switch, a jog wheel, or a jog switch, etc.) and a touch type input unit. As an example, the touch type input unit can be configured with a virtual key displayed on a touch screen through a software processing, a soft key, or a visual key, or a touch key disposed on a portion other than the touch screen. In addition, the virtual key or the visual key is possibly displayed on the touch screen in various types and, for example, can be configured with graphics, texts, icons, videos, or a combination thereof.

Furthermore, the sensing unit 140 can sense at least one of environmental information surrounding the mobile terminal 100 and user information, and generate a sensing signal corresponding to the sensed information. The control unit 180 can control driving or operations of the mobile terminal 100, or perform data processing, a function, or an operation related to an application program installed in the mobile terminal 100, on the basis of the sensing signal. Hereinafter, representative sensors among various sensors that can be included in the sensing unit 140 are described in detail.

Firstly, the proximity sensor 141 refers to a sensor detecting presence of an object accessing or around a predetermined detecting surface by using an electromagnetic force or an infrared ray without a mechanical contact. This proximity sensor 141 can be disposed in an internal area of the mobile terminal surrounded by the above-described touch screen or around the touch screen.

As an example of the proximity sensor 141, there is a transmissive optoelectronic sensor, a diffuse optoelectronic sensor, a high frequency oscillating proximity sensor, a capacitive proximity sensor, an inductive proximity sensor, or an infrared proximity sensor. When the touch screen is capacitive type, the proximity sensor 141 can be configured to detect an access of an object having conductivity by a change of an electric field according to the access of the object. In this case, the touch screen (or a touch sensor) itself can be classified into a proximity sensor.

Moreover, for convenience of explanation, a behavior that an object is in proximity to the touch screen without contacting the touch screen and is allowed to be recognized as if the object is on the touch screen is referred to as a "proximity touch". A behavior that an object actually contacts the touch screen is referred to as a "contact touch". A position at which an object is subject to a proximity touch over the touch screen means a position at which the object vertically corresponds to the touch screen when the object is subject to the proximity touch. The proximity sensor 141 can detect a proximity touch and a proximity touch pattern (e.g., a proximity touch distance, a proximity touch direction, a proximity touch speed, a proximity touch time, a proximity touch position, a proximity touch shift state, etc.). Furthermore, the control unit 180 can process data (or information) corresponding to a proximity touch action and the proximity touch pattern detected through the proximity sensor 141 and, in addition, can output visual information corresponding to the processed data on the touch screen. In addition, the control unit 180 can control the mobile terminal 100 so that different operations or different data (or information) are processed according to whether a touch for an identical point on the touch screen is a proximity touch or a contact touch.

The touch sensor senses a touch (or a touch input) applied to the touch screen (or the display unit 151) by using at least one of various touch schemes including a resistive-film scheme, a capacitive scheme, an infrared ray scheme, an ultrasonic scheme, and a magnetic field scheme.

As an example, the touch sensor can be configured to convert a change in pressure applied to a specific part or a change in capacitance generated at a specific part of the touch screen into an electrical input signal. The touch sensor can be configured to detect a position or an area thereon which is touched by a touch object touching the touch screen, or pressure or capacitance at the time of the touch. Here, the touch object can be an object applying a touch on the touch sensor, for example, a finger, a touch pen, a stylus pen, or a pointer.

In this way, when there is a touch input on the touch sensor, a signal (signals) corresponding thereto is (are) transmitted to a touch controller. The touch controller processes the signal(s) and transmits corresponding data to the control unit 180. Accordingly, the control unit 180 can know which area of the display unit 151 is touched. Here, the touch controller can be a separate element other than the control unit 180, or be the control unit itself.

Furthermore, the control unit 180 can perform different controls or an identical control according to a kind of the touch object, which touches the touch screen (or a touch key prepared other than the touch screen). Whether to perform different controls or an identical control according to a kind of the touch object can be determined according to a current operation state of the mobile terminal 100 or an application program being executed.

The above-described touch sensor and proximity sensor can sense independently or in a combined manner various types of touches on the touch screen, wherein the touches include a short(or a tap) touch, a long touch, a multi-touch, a drag touch, a flick touch, a pinch-in touch, a pinch-out, a swipe touch, and a hovering touch.

The ultrasonic sensor can recognize position information on a touch object by using an ultrasonic wave. The control unit 180 is able to calculate a position of a wave generating source through information sensed by an optical sensor and a plurality of ultrasonic sensors. The position of the wave generating source can be calculated by using a property that a light is very faster than the ultrasonic wave, in other words, a time that a light arrives at an optical sensor is very shorter than a time that an ultrasound wave arrives at an ultrasonic sensor. In detail, the position of the wave generating source can be calculated by using a time difference from a time when an ultrasonic wave arrives with a light considered as a reference signal.

Furthermore, from a view of a configuration of the input unit 120, the camera 121 includes at least one selected from a camera sensor (e.g., a CCD, or a CMOS sensor), a photo sensor (or an image sensor), and a laser sensor.

The camera 121 and the laser sensor can be combined together and sense a touch of the sensing target for a 3-dimensional stereoscopic image. The photo sensor can be stacked on a display element, and this photo sensor scans a movement of the sensing target close to the touch screen. In detail, the photo sensor includes photo diodes and transistors in rows/columns and scans a target mounted on the photo sensor by using an electrical signal changed according to an amount of a light applied to the photo diodes. In other words, the photo sensor performs coordinate calculation on the sensing target according to a change amount of the light and, through this, position information on the sensing target can be obtained.

The display unit 151 displays (outputs) information processed by the mobile terminal 100. For example, the display unit 151 can display execution screen information on the application program driven in the mobile terminal 100 or user interface (UI) information or graphic user interface (GUI) information according to the execution screen information.

In addition, the display unit 151 can be configured as a stereoscopic display unit displaying a stereoscopic image.

A 3-dimensional display scheme such as a stereoscopic scheme (glasses type), an autostereoscopic scheme (glassless type), or a projection scheme (a holographic scheme) can be applied to the stereoscopic display unit.

The sound output unit 152 can output audio data received from the wireless communication unit 110 or stored in the memory 170 in a call signal reception mode, a call mode or a recording mode, a speech recognition mode, or in a broadcast reception mode. The sound output unit 152 can output a sound signal related to a function (e.g., a call signal reception sound, or a message reception sound, etc.) performed in the mobile terminal 100. This sound output unit 152 can include a receiver, a speaker, or a buzzer, etc.

The haptic module 153 can generate various tactile effects that the user can feel. A representative example of the tactile effect that is generated by the haptic module 153 can be vibration. Strength and a pattern of the vibration generated by the haptic module 153 can be controlled by user selection or setting by the control unit. For example, the haptic module 153 can output different vibrations sequentially or by synthesizing them.

Besides the vibration, the haptic module 153 can generate various tactile effects including an effect by a stimulus such as a pin array moving vertically to a contact skin surface, a air discharge force or air absorptive power through an outlet or an inlet, brush against a skin surface, contact to an electrode, or static electricity, and an effect by reproducing a cold and warmth sense by using a device that heat absorption or heating is enabled.

The haptic module 153 can be implemented to transfer the tactile effect through a direct contact, and can also be implemented for the user to feel the tactile effect through a muscle sense of a finger or an arm. The haptic module 153 can be prepared two or more in number according to a configuration aspect of the mobile terminal 100.

The optical output unit 154 can output a signal for notifying an event occurrence by using a light from an optical source of the mobile terminal 100. The event occurred in the mobile terminal 100 can be exemplified with message reception, call signal reception, missed calls, alarm, schedule notification, email reception, or information reception through an application.

The signal output by the optical output unit 154 is implemented according to that the mobile terminal emits a monochromatic light or a multi-chromatic light towards the front or rear surface. The signal output can be completed when the mobile terminal detects that the user checks the event.

The interface unit 160 can play a role of a passage with all external devices connected to the mobile terminal 100. The interface unit 160 can receive data from the external device, receive power and transfer the power to each element inside the mobile terminal 100, or allow internal data of the mobile terminal 100 to be transmitted to the external device. For example, the interface 160 can include a wired/wireless headset port, an external charger port, a wired/wireless data port, a memory card port, a port connecting a device that an identification module is prepared, an audio input/output (I/O) port, a video input/output (I/O) port, or an earphone port, etc.

Furthermore, the identification module is a chip storing various pieces of information for authenticating user's authority for the mobile terminal 100 and can include a user identify module (UIM), a subscriber identity module (SIM), or a universal subscriber identity module (USIM). A device including the identification module (hereinafter, an 'identification device') can be manufactured in a smart card type. Accordingly, the identification device can be connected to the mobile terminal 100 through the interface unit 160.

In addition, when the mobile terminal 100 is connected to an external cradle, the interface unit 160 can be a passage through which power is supplied from the cradle to the mobile terminal 100 or a passage through which various command signals input from the cradle by the user are delivered. The various command signals or the power input from the cradle can operate as signals for perceiving that the mobile terminal 100 is accurately mounted in the cradle.

The memory 170 can store a program for operations of the control unit 180 and temporarily store input/output data (e.g., a phone book, messages, still images, videos, etc.). The memory 170 can store data about vibrations of various patterns and sounds at the time of a touch input on the touch screen.

The memory 170 can include at least one storage medium type among a flash memory type, a hard disk type, a Solid State Disk (SSD) type, a Silicon Disk Drive (SDD) type, a multimedia card micro type, a card type memory (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk and an optical disc. The mobile terminal 100 can operate in relation to a web storage performing a storage function of the memory 170 over the internet.

Furthermore, as described above, the controller 180 normally controls overall operations and an operation related to an application program of the mobile terminal 100. For example, when a state of the mobile terminal satisfies a set condition, the control unit 180 executes or releases a lock state that limits an input of a user's control command to applications.

In addition, the control unit 180 can perform a control or a process related to a voice call, data communication, or a video call, etc., or can perform a pattern recognition processing for recognizing a written input and a drawing input performed on the touch screen as a character and an image, respectively. Furthermore, the control 180 can combine and control any one of or a plurality of the above-described elements in order to implement various embodiments to be described below in the mobile terminal 100.

The power supply unit 190 receives external or internal power under a control of the control unit 180 and supplies power necessary for operating each element. The power supply unit 190 includes a battery. The battery can be an embedded battery that is rechargeable and can be detachably coupled for charging.

The power supply unit 190 can include a connection port, and the connection port can be configured as an example of the interface 160 to which an external charger providing power is electrically connected for charging the battery.

As another example, the power supply unit 190 can be configured to charge the battery in a wireless manner without using the connection port. In this case, the power supply unit 190 can receive, from an external wireless power transmitting device, power by using one or more of an inductive coupling manner on the basis of a magnetic induction phenomenon and a magnetic resonance coupling manner on the basis of an electromagnetic resonance phenomenon.

Hereinafter, various embodiments can be implemented in a recording medium that is readable with a computer or a similar device by using software, hardware, or a combination thereof.

Next, description is made about a communication system realizable through the mobile terminal 100 according to an embodiment.

Firstly, the communication system can use different wireless interfaces and/or a physical layer. For example, the wireless interface available by the communication system can include Frequency Division Multiple Access (FDMA), Time Division Multiple Access (TDMA), Code Division Multiple Access (CDMA), Universal Mobile Telecommunications Systems (UMTS)(in particular, Long Term Evolution (LTE), or Long Term Evolution-Advanced (LTE-A)), Global System for Mobile Communications (GSM), or etc.

Hereinafter, for convenience of explanation, description is made limitedly to CDMA. However, it is obvious that the embodiments can be applied to all communication systems including an Orthogonal Frequency Division Multiplexing (OFDM) wireless communication system as well as a CDMA wireless communication system.

The CDMA wireless communication system can include at least one terminal 100, at least one base station (BS, also can be referred to as Node B or Evolved Node B), at least one BS controller (BSC) and a mobile switching center (MSC). The MSC can be configured to be connected to the Public Switched Telephone Network (PSTN) and BSCs. The BSCs can be connected to the BS in pair through a backhaul line. The backhaul line can be prepared according to at least one selected from E1/T1, ATM, IP, PPP, Frame Relay, HDSL, ADSL, and xDSL. Accordingly, the plurality of BSCs can be included in a CDMA wireless communication system.

Each of a plurality of BSs can include at least one sector, and each sector can include an omni-directional antenna or an antenna indicating a specific radial direction from the BS. In addition, each sector can include two or more antennas having various types. Each BS can be configured to support a plurality of frequency allocations and each of the plurality of allocated frequencies can have specific spectrum (e.g., 1.25 MHz, or 5 MHz).

An intersection between the sector and the frequency allocation can be called as a CDMA channel. The BS can be called as a base station transceiver subsystem (BTSs). In this case, one BSC and at least one BS are called together as a "base station". The base station can also represent a "cell site". In addition, each of a plurality of sectors for a specific BS can also be called as a plurality of cell sites.

A broadcasting transmitter (BT) transmits a broadcast signal to terminals 100 operated in a system. The broadcast reception module 111 illustrated in FIG. 4 is prepared in the terminal 100 for receiving the broadcast signal transmitted by the BT.

Furthermore, in the CDMA wireless communication system, a global positioning system (GPS) can be linked for checking a location of the mobile terminal 100. A satellite is helpful for grasping the location of the mobile terminal. Useful location information can be obtained by less than two or at least two satellites. Here, the location of the mobile terminal 100 can be tracked by using all techniques, which are capable of tracking the location, as well as a GPS tracking technique. In addition, at least one of GPS satellites can be selectively or additionally responsible for transmitting satellite digital multimedia broadcasting (DMB).

The location information module 115 prepared in the mobile terminal 100 is for detecting, operating or identifying the location of the mobile terminal 100, and can representatively include a GPS module and a WiFi module. If necessary, the location information module 115 can alternatively or additionally perform any function of other modules in the wireless communication unit 110 for obtaining data for the location of the mobile terminal 100.

The GPS module 115 can precisely calculate 3D current location information according to latitude, longitude, and altitude by calculating distance information from three or more satellites and precise time information, and by applying a trigonometry to the calculated information. A method is currently widely used that calculates location and time information using three satellites, and corrects an error in the calculated location and time information using another satellite. The GPS module 115 can calculate speed information by continuously calculating a current location in real time. However, it is difficult to precisely measure the location of the mobile terminal 100 by using the GPS module in a dead zone, such as an indoor area, of the satellite signal. Accordingly, in order to compensate for location measurement in the GPS manner, a WiFi positioning system (WPS) can be used.

The WPS is a technique for tracking the location of the mobile terminal 100 using a WiFi module prepared in the mobile terminal 100 and a wireless access point (AP) transmitting or receiving a wireless signal to or from the WiFi module, and can mean a location measurement technique based on a wireless local area network (WLAN) using WiFi.

The WPS can include a WiFi positioning server, the mobile terminal 100, a wireless AP connected to the mobile terminal 100, and a database storing arbitrary wireless AP information.

The mobile terminal 100 connected to the wireless AP can transmit a location information request message to the WiFi positioning server.

The WiFi positioning server extracts information on the wireless AP connected to the mobile terminal 100 on the basis of the location information request message (or a signal) of the mobile terminal 100. The information on the wireless AP connected to the mobile terminal 100 can be transmitted to the WiFi positioning server through the mobile terminal 100 or transmitted to the WiFi positioning server from the wireless AP.

The information on the wireless AP, which is extracted on the basis of the location information request message of the mobile terminal 100, can be at least one selected from a MAC address, a Service Set Identification (SSID), a Received Signal Strength Indicator (RSSI), Reference Signal Received Power (RSRP), Reference Signal Received Quality (RSRQ), channel information, Privacy, a Network Type, Signal Strength, and Noise Strength.

As described above, the WiFi positioning server can receive information on the wireless AP connected to the mobile terminal 100, and extract wireless AP information corresponding to the wireless AP to which the mobile terminal is being connected from the pre-constructed database. At this point, information on arbitrary wireless APs, which is stored in the database, can be information on a MAC Address, an SSID, channel information, Privacy, a Network Type, latitudinal and longitudinal coordinates of a wireless AP, a building name and floor on which the wireless AP is located, indoor detailed location information (GPS coordinates available), an address of an owner of the wireless AP, a phone number, and etc. At this point, in order to remove a wireless AP provided by using a mobile AP or an illegal MAC address in the location measurement process, the WiFi positioning server can extract a predetermined number of pieces of wireless AP information in the descending order of an RSSI.

Thereafter, the WiFi positioning server can extract (or analyze) location information on the mobile terminal 100 by using at least one piece of wireless AP information extracted from the database. The location information of the mobile terminal 100 is extracted (or analyzed) by comparing the stored and the received wireless AP information.

As a method of extracting (or analyzing) location information on the mobile terminal 100, a cell-ID method, a fingerprint method, a trigonometry, and a landmark method can be used.

The cell-ID method is a method of determining a location of a wireless AP having strongest strength from among surrounding wireless AP information collected by a mobile terminal. This method is advantageous in that implementation is simple, an additional cost is not necessary, and location information can be rapidly obtained. However, when installation intensity of a wireless AP is lower, positioning precision becomes lowered.

The fingerprint method is a method of selecting a reference location in a service area, collecting signal strength information, and estimating a location through signal strength information transmitted from a mobile terminal on the basis of the collected information. In order to use the fingerprint method, it is necessary to construct a database for propagation characteristics in advance.

The trigonometry is a method of operating a location of a mobile terminal on the basis of a distance between coordinates of at least three wireless APs and the mobile terminal. For estimating the distances between the mobile terminal and the wireless APs, signal strength is converted into distance information, or a time of arrival (ToA) of a wireless signal, a time difference of arrival (TDoA) of a wireless signal, an angle of arrival (AoA) of a wireless signal can be used.

The landmark method is a method of measuring a location of a mobile terminal by using a landmark transmitter.

Besides the above-described methods, various algorithms can be used for extracting (or analyzing) location information on a mobile terminal.

The location information on the mobile terminal 100 extracted in this way can be transmitted to the mobile terminal 100 through the WiFi positioning server and the mobile terminal 100 can obtain the location information.

The mobile terminal 100 can obtain location information by being connected to at least one wireless AP. At this point, the number of wireless APs requested for obtaining the location information on the mobile terminal 100 can be variously varied according to a wireless communication environment in which the mobile terminal 100 is located.

Various embodiments of a method for operating the flexible display device 200 will be described. The embodiments can be applied to both the stretchable display device 200_1 described above with reference to FIGS. 2A and 2B and the rollable display device 200_2 described above with reference to FIGS. 3A to 3F.

Figure 5:
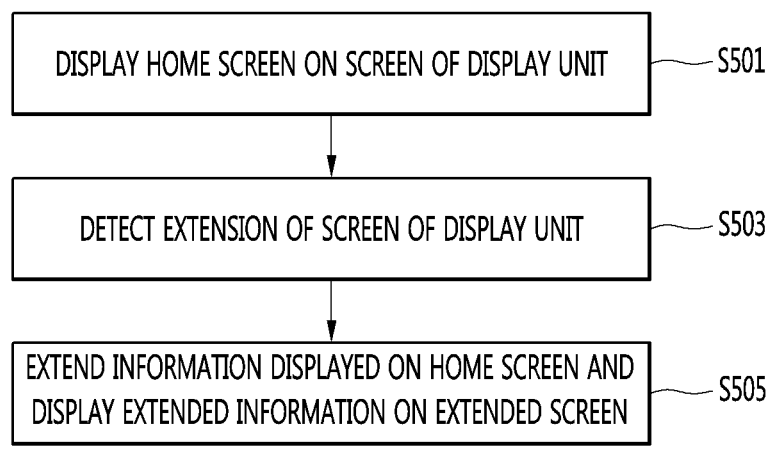
FIG. 5 is a flowchart illustrating a method for operating a flexible display device according to an embodiment of the present disclosure.

FIG. 5 is a flowchart illustrating a method for operating a flexible display device according to an embodiment of the present disclosure.

The control unit 290 of the flexible display device 200 displays a home screen via the display unit 250 (S501). In operation S501, the screen of the display unit 250 can be in an undeformed state. The undeformed state can represent a state in which the screen of the display unit 250 is not extended or reduced.

The control unit 290 can control the display unit 250 so that the display unit 250 displays the home screen in the undeformed state in response to an input selecting a home button (not shown). The home button (not shown) can be provided at the intermediate case 220 or as input area displayed on the display unit, but it not limited thereto.

Various types of information can be displayed on the home screen, described below with reference to FIG. 6.

Figure 6:
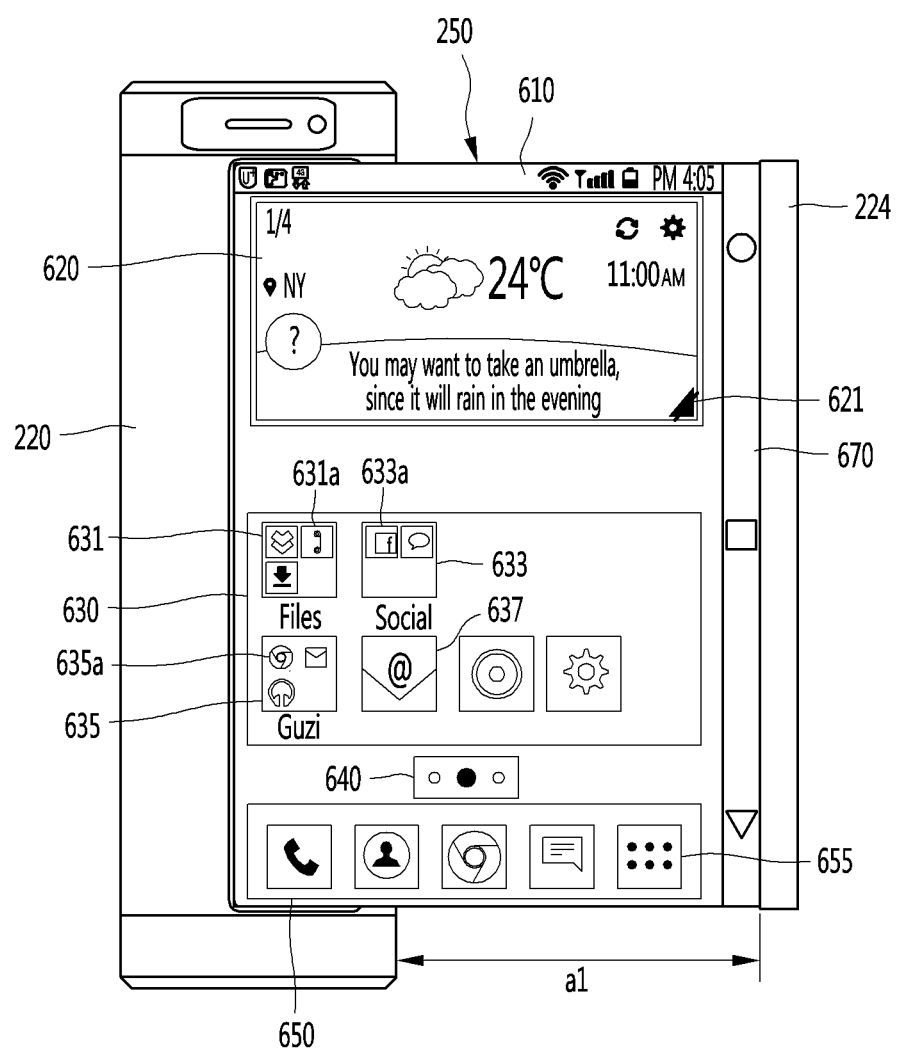
FIG. 6 is a diagram illustrating a configuration of a home screen displayed before a screen of a display unit is deformed according to an embodiment of the present disclosure.

FIG. 6 is a diagram illustrating an example of a configuration of a home screen displayed before the screen is deformed according to an embodiment of the present disclosure.

The following description is provided with regard to a rollable display device 200-2. However, the disclosure is not limited thereto, and other embodiments include the stretchable display device 200-1 or a foldable display device in which the screen of the display unit 250 can be folded at least once.

The screen of the rollable display unit 250 can be in a state of being extended by a distance a1. Thus where the screen of the display unit 250 has at least a certain size, the home screen may be displayed. It is also contemplated wherein FIG. 6 represents an initial state in which the screen of the display unit 250 is not deformed and the screen of the display unit 250 corresponding to the distance a1 is an initial screen state.

Referring to FIG. 6, the home screen can include a status bar region 610, a widget region 620, an application region 630, a page indicator region 640, a favorites region 650, and a key input region 670.

The status bar region 610 can include information on an operational state of the flexible display device 200. The status bar region 610 can include small-sized icons representing the information on an operational state of the flexible display device 200. The status bar region 610 can be disposed at an upper end of the home screen.

The widget region 620 can include a widget, in some cases set by the user. The widget can be a mini application program that provides weather, calendar, or schedule information without requiring execution of an additional application. An indicator 621, which indicates that there is more information to be provided through the widget, can be further displayed at an edge of the widget region 620.

The application region 630 can include a plurality of app icons respectively corresponding to a plurality of applications and a plurality of folders 631, 633, and 635 containing the plurality of app icons. In the following embodiments, it is assumed that the first folder 631 includes three app icons, the second folder 633 includes two app icons, and the third folder 635 includes four or more app icons.

In the case where the home screen includes a plurality of pages, the page indicator region 640 can indicate what page is currently displayed on the screen.

The favorites region 650 can include a plurality of app icons respectively corresponding to a plurality of applications registered as favorites. The favorites region 650 can include a see-more icon 655 for further providing applications not displayed on the home screen.

The key input region 670 can be a region for controlling the screen according to a touch input. The key input region 670 can include a home button for moving to the home screen, a back button for returning to a previous screen, and a menu button for editing a page displayed on the screen.

The method of FIG. 5 continues to be described below referring back to FIG. 5.

The control unit 290 detects that the screen of the display unit 250 is extended (S503), and extends and displays information included in the home screen so that the information matches a size of an extended screen (S505). The control unit 290 can detect extension or reduction of the display unit 250 via the sensing unit 210. The sensing unit 210 can detect a screen size, as discussed with reference to FIGS. 3A to 3F.

In one embodiment, the control unit 290 can detect that the screen is extended while the key input region 670 included in the home screen is selected. In this case, the control unit 290 can extend and display information included in the home screen so that the information matches a size of an extended screen. However, embodiments are not limited thereto, and in the case where the flexible display device 200 is set to operate in a folder extension mode, the control unit 290 can extend and display the information included in the home screen so that the information matches the size of the extended screen even when the key input region 670 is not selected.

In one embodiment, the extension of the information included in the home screen can represent that information included in a specific region among a plurality of regions included in the home screen is extended and displayed.

In another embodiment, the extension of the information included in the home screen can represent that information included in a specific region among a plurality of regions included in the home screen is extended and displayed while additional information is displayed on another region. Operations S503 and S505 are described below with reference to the following figures.

FIGS. 7A to 7D are diagrams illustrating an example in which information included in a home screen is extended as a screen size of a display unit increases.

In particular, FIGS. 7A to 7D illustrate examples in which a folder and an app icon corresponding to an application included in the folder are magnified and displayed on the basis of a location of the folder and the number of times the application has been executed as a screen is extended.

Regarding FIG. 7A, descriptions which overlap with those of FIG. 6 are not provided below. The application region 630 of FIG. 7A can include the first to third folders 631, 633, and 635. Each folder can include a plurality of app icons respectively corresponding to a plurality of applications. The first and second folders 631 and 633 can be arranged in a first row, and the third folder 635 can be arranged in a second row different from that of the first and second folders 631 and 633.

Figure 7A:
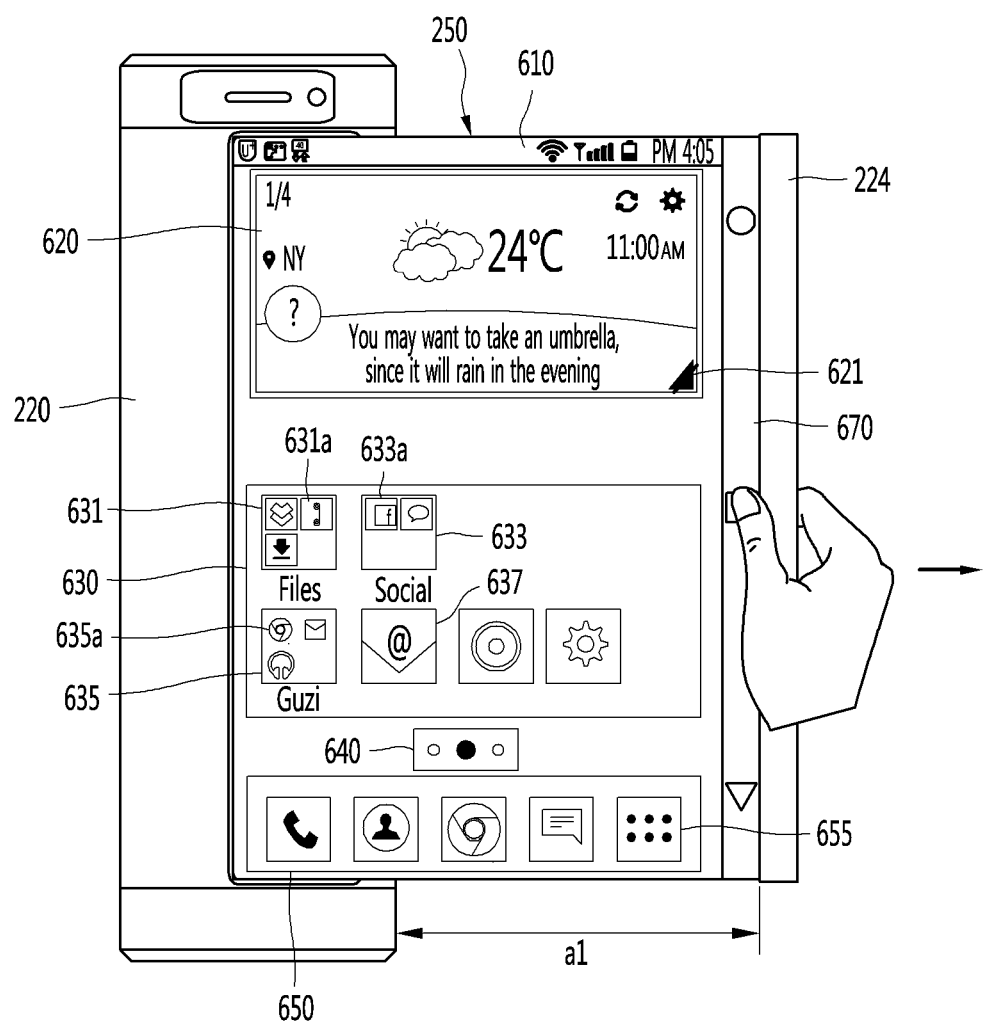
FIGS. 7A, 7B, 7C, and 7D are diagrams illustrating an example in which information included in a home screen is extended as a screen size of a display unit increases according to an embodiment of the present disclosure.
Figure 7B:
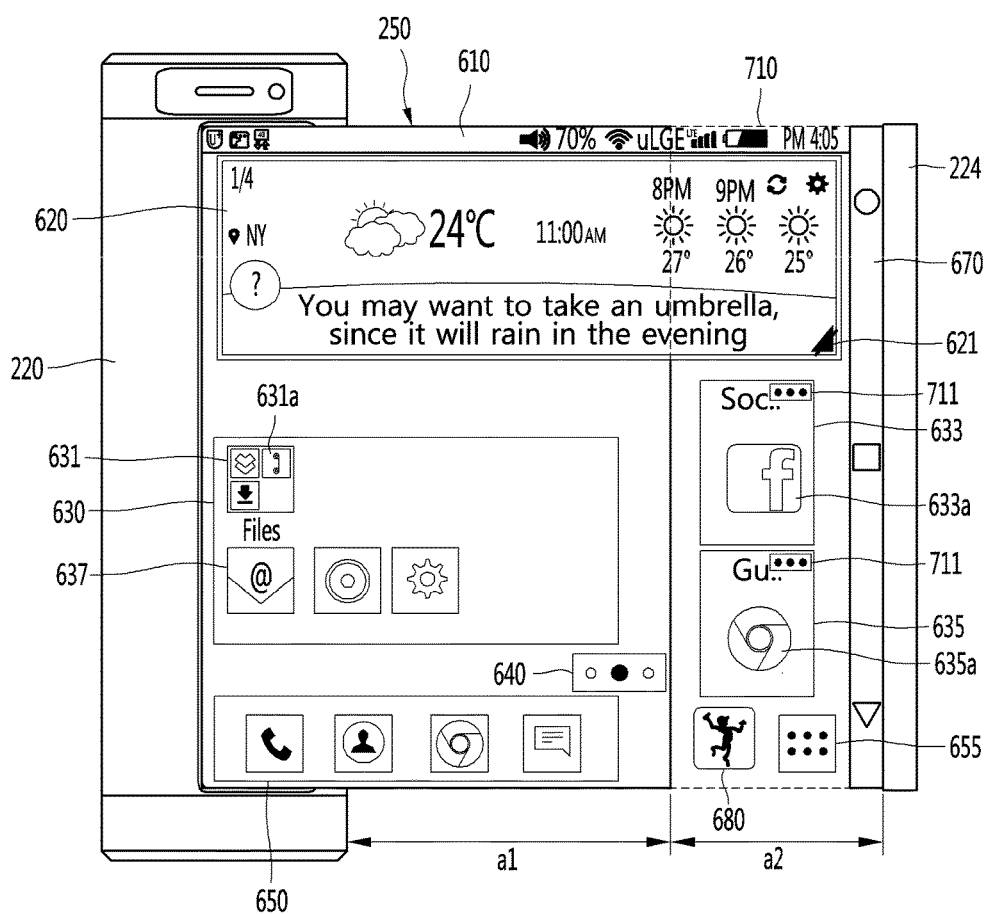

In the case where the screen of the display unit 250 is extended in a state in which an input for selecting the key input region 670 has been received, the control unit 290 can extend the screen of the display unit 250 by as much as a region 710 corresponding to a distance a2 as illustrated in FIG. 7B. The distance a2 can be equal to the distance a1, but is not limited thereto. That is, the distance a2 can be smaller than the distance a1. The control unit 290 can display the extended second folder 633 and the extended third folder 635 on the screen extended by as much as the region 710. The control unit 290 can gradually display the second and third folder 633 and 635 while extending the screen.

In one embodiment, the control unit 290 can display, on the extended region 710, a more frequently used (or accessed) folder between the first and second folders 631 and 633 arranged in the first row before the screen is extended. In detail, the control unit 290 can compare a total number of times the applications included in the first folder 631 have been executed during a certain period with a total number of times the applications included in the second folder 633 have been executed during the certain period, so as to determine a folder to be displayed on the extended region 710. In another embodiment, the control unit may compare a total number of execution times without limit to a certain time period, or the comparison may include comparing a total amount of time spent using the applications after execution instead of counting the number of times an application is executed.

In the case where the total number of times the applications included in the second folder 633 have been executed during the certain period is larger than the total number of times the applications included in the first folder 631 have been executed during the certain period, the control unit 290 can display the second folder 633 on the extended region 710. An app icon 633a can be displayed on the second folder 633. The app icon 633a can be an icon corresponding to an application that has most frequently been executed during the certain period among the applications included in the first folder 631 and the applications included in the second folder 633. Furthermore, the app icon 633a illustrated in FIG. 7B can be displayed larger than the app icon 633a illustrated in FIG. 7A. An indicator 711, which indicates that there remain more app icons included in the second folder 633, can be further displayed on the second folder 633. The number of the remaining app icons not displayed can be displayed on the indicator 711.

The control unit 290 can enlarge and display the third folder 635 arranged in the second row, as the screen is extended. An app icon 635a corresponding to an application most frequently executed during the certain period, among the app icons included in the third folder 635, can be magnified and displayed on the third folder 635. The app icon 635a illustrated in FIG. 7B can be displayed larger than the app icon 635a illustrated in FIG. 7A.

Furthermore, as the second and third folders 633 and 635 are displayed on the extended region 710, the control unit 290 may not display the second and third folders 633 and 635 on the application region 630. That is, as the second and third folders 633 and 635 are displayed on the extended region 710, the second and third folders 633 and 635 displayed on the application region 630 disappear. However in the depicted embodiment, the first folder 631 not displayed on the extended region 710 remains at its original position.

Furthermore, the number of app icons displayed on the extended region can be vary with the size of the extended region. That is, as the size of the extended region becomes larger, the number of app icons increases, and, as the size of the extended region becomes smaller, the number of app icons decreases.

Meanwhile, as the screen is extended, information included in the application region 630 can be magnified and displayed to match the extended size of the screen. That is, the first folder 631 and an email icon 637 illustrated in FIG. 7B can be displayed larger than those illustrated in FIG. 7A.

Meanwhile, an app icon 680 corresponding to recently executed applications can be displayed at a lower end of the extended region 710. As the screen is extended, the see-more icon 655 included in the favorites region 650 can be moved to a lower right side of the extended region 710.

As the screen is extended, the control unit 290 can also extend the widget region 620. In detail, the control unit 290 can enlarge the widget region 620 to a size corresponding to the extended region 710. The control unit 290 can further display, on the magnified widget region 620, additional information not displayed before the extension of the screen. This operation will be described later.

As the screen is extended, the control unit 290 can also extend the status bar region 610. In detail, the control unit 290 can display more specific information displayed on the status bar region 610 before the extension of the screen. The control unit may also display information which was not previously displayed on the status bar region before the extension of the screen. This operation will be described later.

Figure 7C:
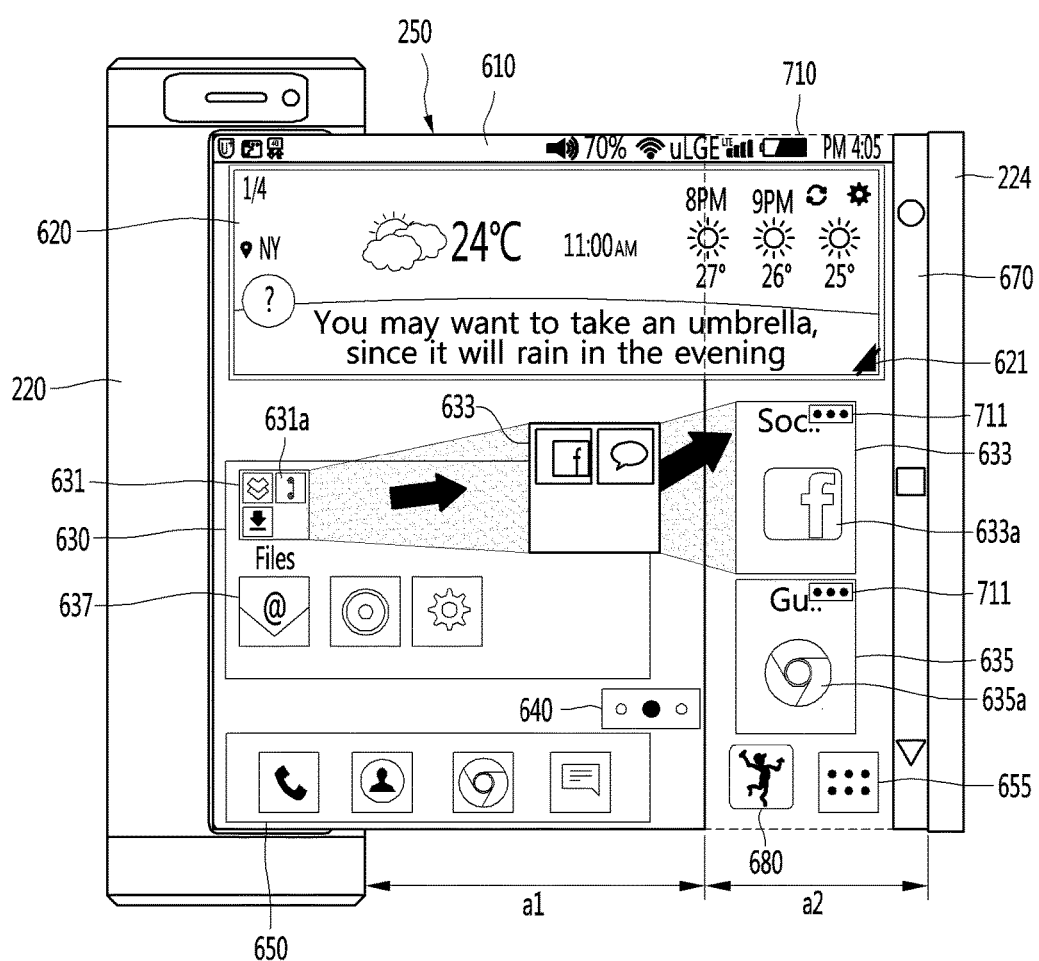

Referring to FIG. 7C, the control unit 290 can provide an animation effect indicating a process in which the second folder 633 is moved to the extended region 710. That is, as the screen of the display unit 250 is extended, the second folder 633 can be gradually increased in size and can be moved to the extended region 710. Although not illustrated in Fig. 7C, the third folder 635 arranged in the second row can also be gradually increased and can be moved to the extended region 710 so as to have the animation effect, as the screen is extended.

Figure 7D:
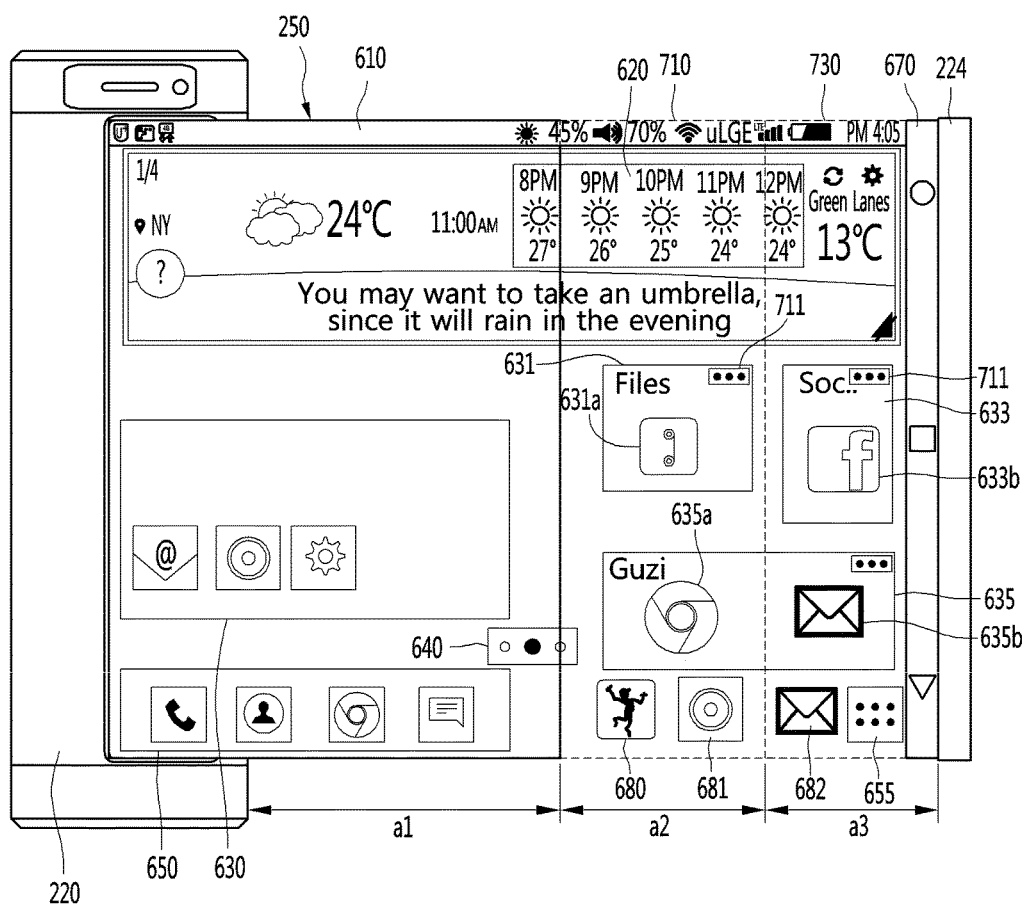

Meanwhile, in the case where the screen of the display unit 250 is further extended by as much as a region 730 corresponding to a distance a3 after being extended by as much as the region 710 as illustrated in FIG. 7D, the control unit 290 can respectively display, on the previously extended region 710 and the extended region 730, the first and second folders 631 and 633 arranged in the first row. The distance a3 can be equal to the distance a2, but embodiments are not limited thereto.

An app icon 631a displayed on the extended region 710 can correspond to an application which has the next highest execution frequency after the application corresponding to the app icon 633a among the applications included in the first and second folders 631 and 633. In this case, since the first folder 631 including the app icon 631a was disposed at a left side of the second folder 633 (see FIG. 7A), the first folder 631 can be displayed at the left side of the second folder 633. Meanwhile, as the screen is further extended by as much as the region 730, the third folder 635 arranged in the second row can be magnified, and, at the same time, another app icon 635b included in the third folder 635 can be displayed. This is because there is no folder other than the third folder 650 in the second row. The app icon 635b can correspond to an application which has next most frequently been executed after the application corresponding to the app icon 635a among the icons included in the third folder 635.

Meanwhile, app icons 681 and 682 of applications which were executed before execution of the application for app icon 680 can be displayed at lower ends of the extended regions 720 and 730. As the screen is extended by as much as the region 730, the see-more icon 655 can be moved to a lower right side of the extended region 730.

According to another embodiment, the control unit 290 can enlarge and display a folder and an app icon corresponding to an application included in the folder on the basis of the number of times the application has been executed as a screen is extended.

Figure 8A:
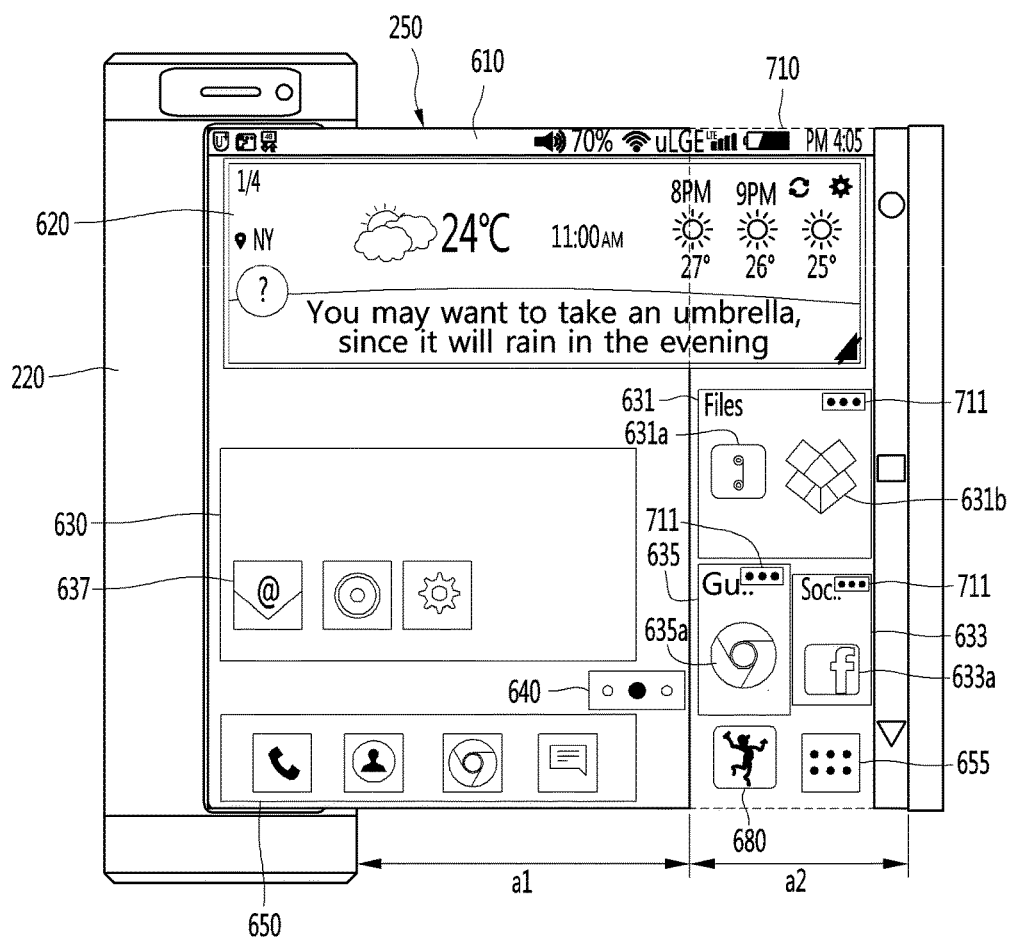
FIGS. 8A and 8B are diagrams illustrating another example in which information included in a home screen is extended as a screen size of a display unit increases.
Figure 8B:
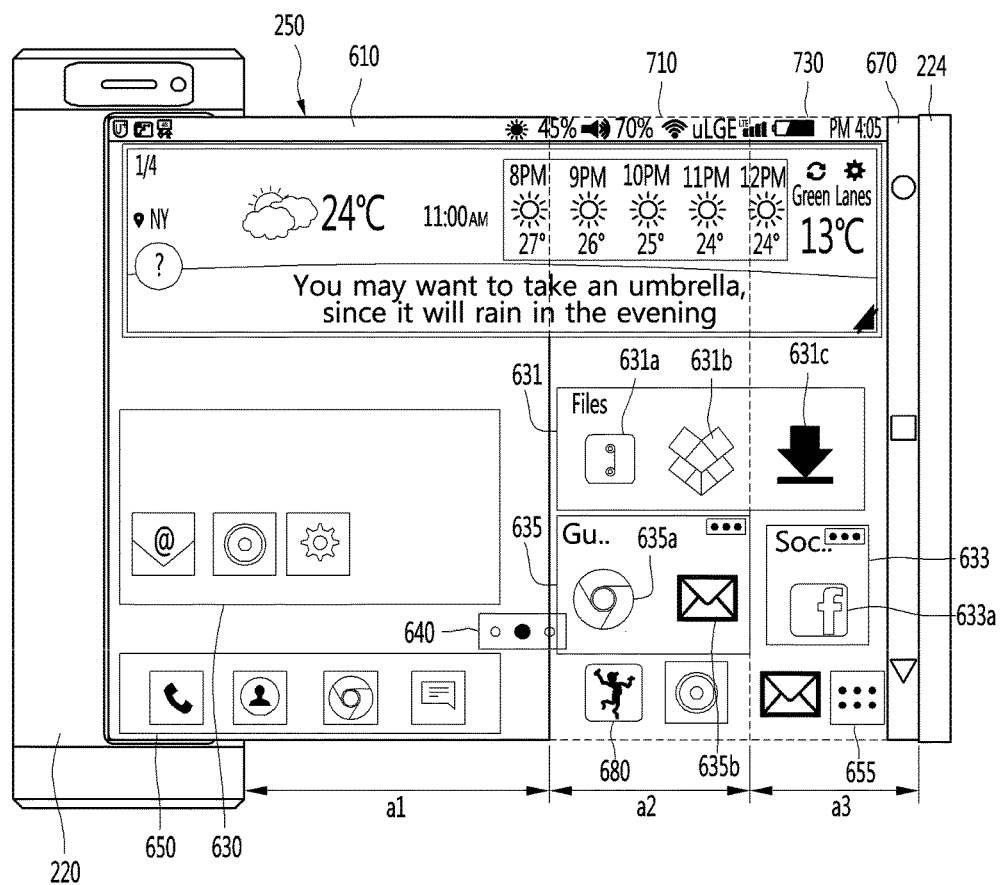

FIGS. 8A and 8B are diagrams illustrating another example in which information included in a home screen is extended as a screen size of a display unit increases.

In particular, FIGS. 8A and 8B illustrate an example in which a folder and an app icon corresponding to an application included in the folder are magnified and displayed on the basis of the number of times the application has been executed as a screen is extended.

In the example of FIG. 8A, it is assumed that among the applications included in the first to third folders 631, 633, and 635, the application corresponding to the app icon 631a has most frequently been executed during a certain period, and an application corresponding to an app icon 631b, the application corresponding to the app icon 635a, and the application corresponding to the app icon 633a follow thereafter.

In the case where the screen is extended by as much as the region 710 after the key input region 670 is selected in the state of FIG. 7A, the control unit 290 can display, on the extended region 710, the extended first folder 631, the extended third folder 635, and the extended second folder 633 as illustrated in FIG. 8A. The app icon 631a corresponding to the application most frequently executed during the certain period and the app icon 631b corresponding to the application next most frequently executed can be magnified and displayed on the first folder 631.

The third folder 635 including the app icon 635a with a priority following that of the app icon 631b can be magnified and displayed under the first folder 631, and the second folder 633 including the app icon 633a with a priority following that of the app icon 635a can be magnified and displayed at a right side of the third folder 635. That is, instead of displaying the other app icons included in the third folder 635, the second folder 633 and the app icon 633a included in the second folder 633 can be displayed.

According to another embodiment, the control unit 290 can only display, on the extended region 710, the app icon 631a corresponding to the most frequently executed application and the first folder 631 including the app icon 631a. Accordingly, the first folder 631 displayed on the home screen disappears.

In the case where the screen is further extended by as much as the region 730 in the state of FIG. 8B, the control unit 290 can display, on the extended region 730, another app icon 631c included in the first folder 631. Since there is no folder other than the first to third folders 631, 633, and 635 on the home screen, the app icon 631a not displayed among the app icons included in the first folder 631 can be displayed on the extended region 730. In this case, the app icon 631c can be an icon corresponding to an application next most frequently executed after the application corresponding to the app icon 631b among the app icons included in the first folder 631.

Furthermore, the control unit 290 can display the other app icon 635b included in the third folder 635 on the extended region 710, and can move the second folder 633 to the extended region 730. The app icon 635b can be an icon having a next largest execution number after the app icon 633a.

According to another embodiment, in the case where a screen is further extended in a state in which all icons included in a specific folder are displayed on an extended region, the folder can be moved to its original position and app icons included in another folder can be additionally displayed.

FIGS. 9A to 9D are diagrams illustrating another example in which information included in a home screen is extended as a screen size of a display unit increases.

Figure 9A:
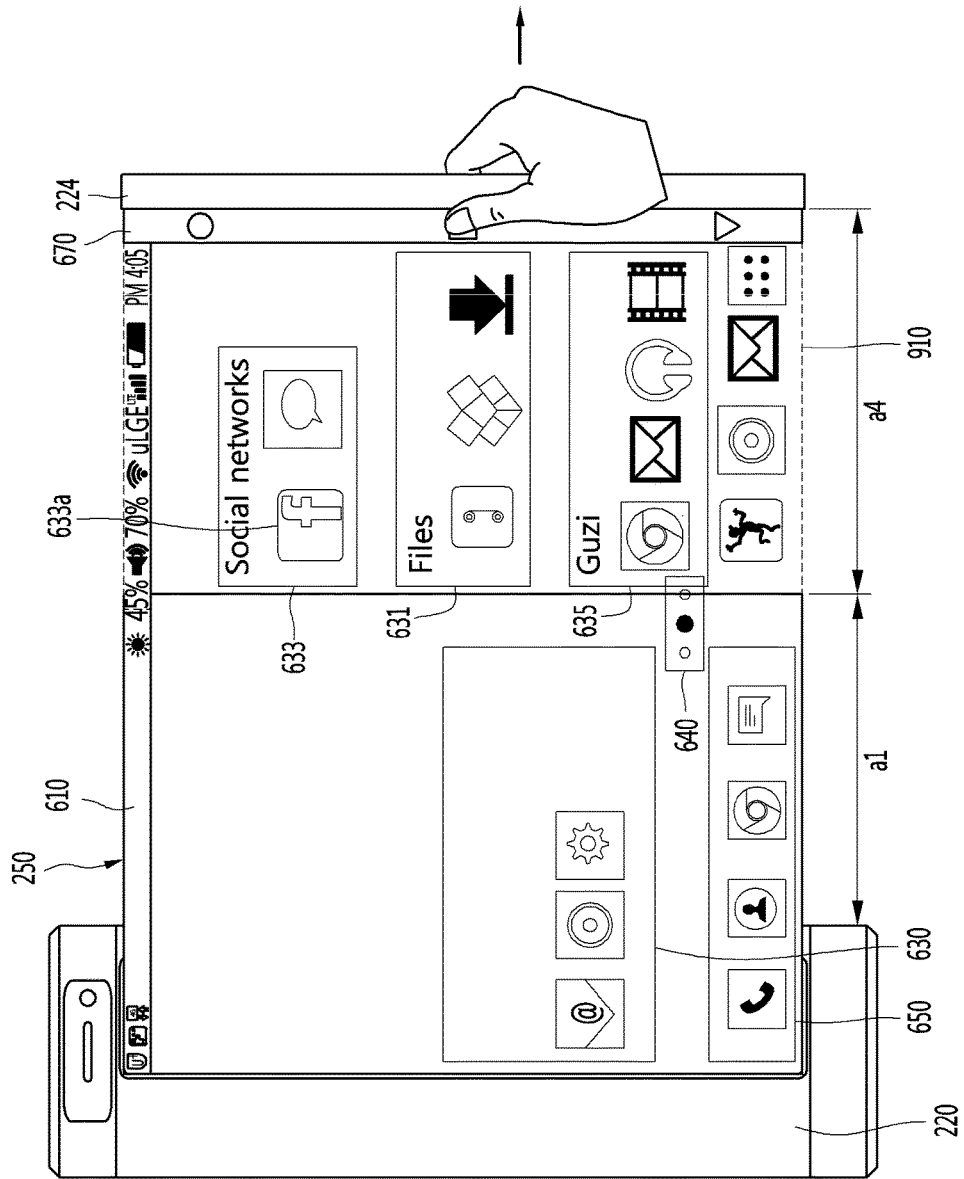
FIGS. 9A, 9B, 9C, and 9D are diagrams illustrating another example in which information included in a home screen is extended as a screen size of a display unit increases.

Referring to FIG. 9A, the control unit 290 can display, on an extended region 910 corresponding to a distance a4, the folders 631, 633, and 635 previously displayed on a home screen. For example, in the case where the execution count of the applications included in the second folder 633 during a certain period is the largest and the first and third folders 631 and 635 respectively follow thereafter, the control unit 290 can arrange the second folder 633, the first folder 631, and the third folder 635 in this order based on the respective execution counts from top to bottom as illustrated in FIG. 9A.

Figure 9B:
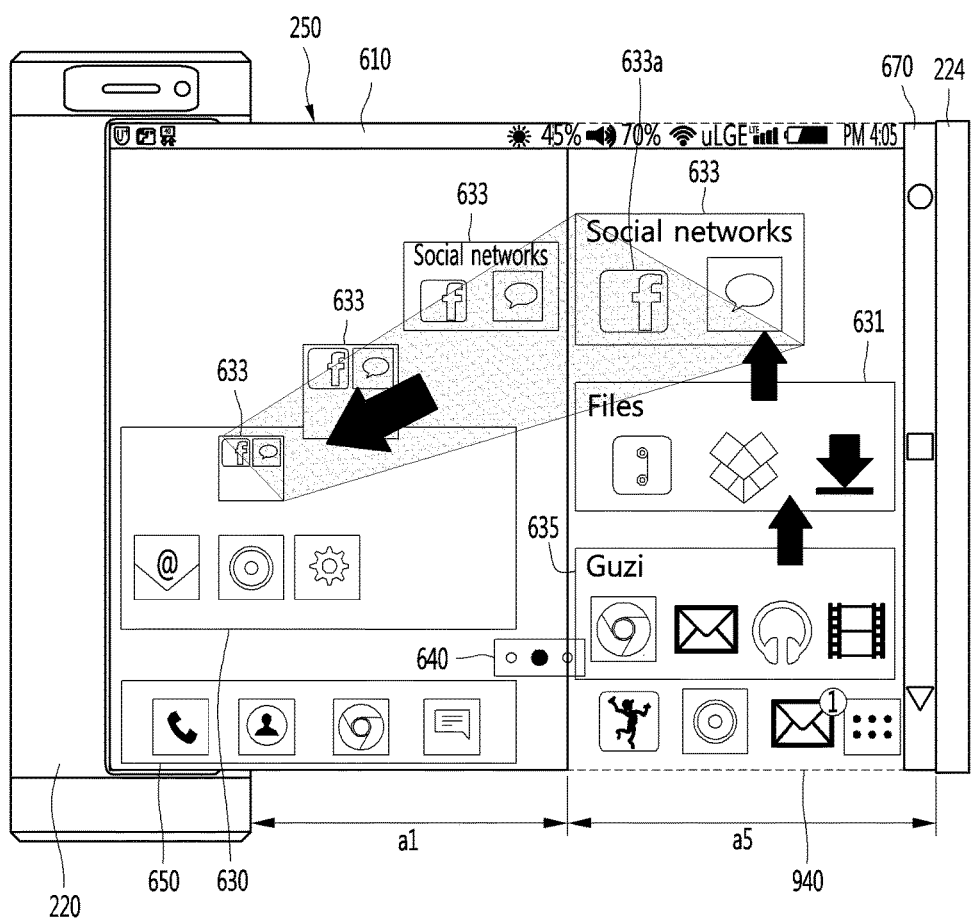

In the case where the screen is extended by a distance a5 while the key input region 670 is selected in FIG. 9A, the control unit 290 can move the magnified second folder 633 to its original position as illustrated in FIG. 9B. While moving the magnified second folder 633 to its original position, the control unit 290 can provide an animation effect of gradually reducing the second folder 633. The second folder 633 can be changed into its original shape. Meanwhile, while the magnified second folder 633 is moved to its original position, the folders 631 and 635 with next highest priorities can be moved upwards. That is, while moving the first folder 631 to a position of the second folder 633, the control unit 290 can display the first folder 631 larger. Likewise, while moving the third folder 635 to a previous position of the first folder 631, the control unit 290 can display the third folder 635 larger. While the first and third folder 631 and 635 are moved, the animation effect can be provided.

The extension of a screen by the user can indicate that an app icon desired by the user is not currently displayed. In the case where all icons included in a specific folder are displayed as the screen is extended, the specific folder can be moved to its original position and can be changed to its original size, and a folder with a next highest priority can be moved to a position of the specific folder.

Figure 9C:
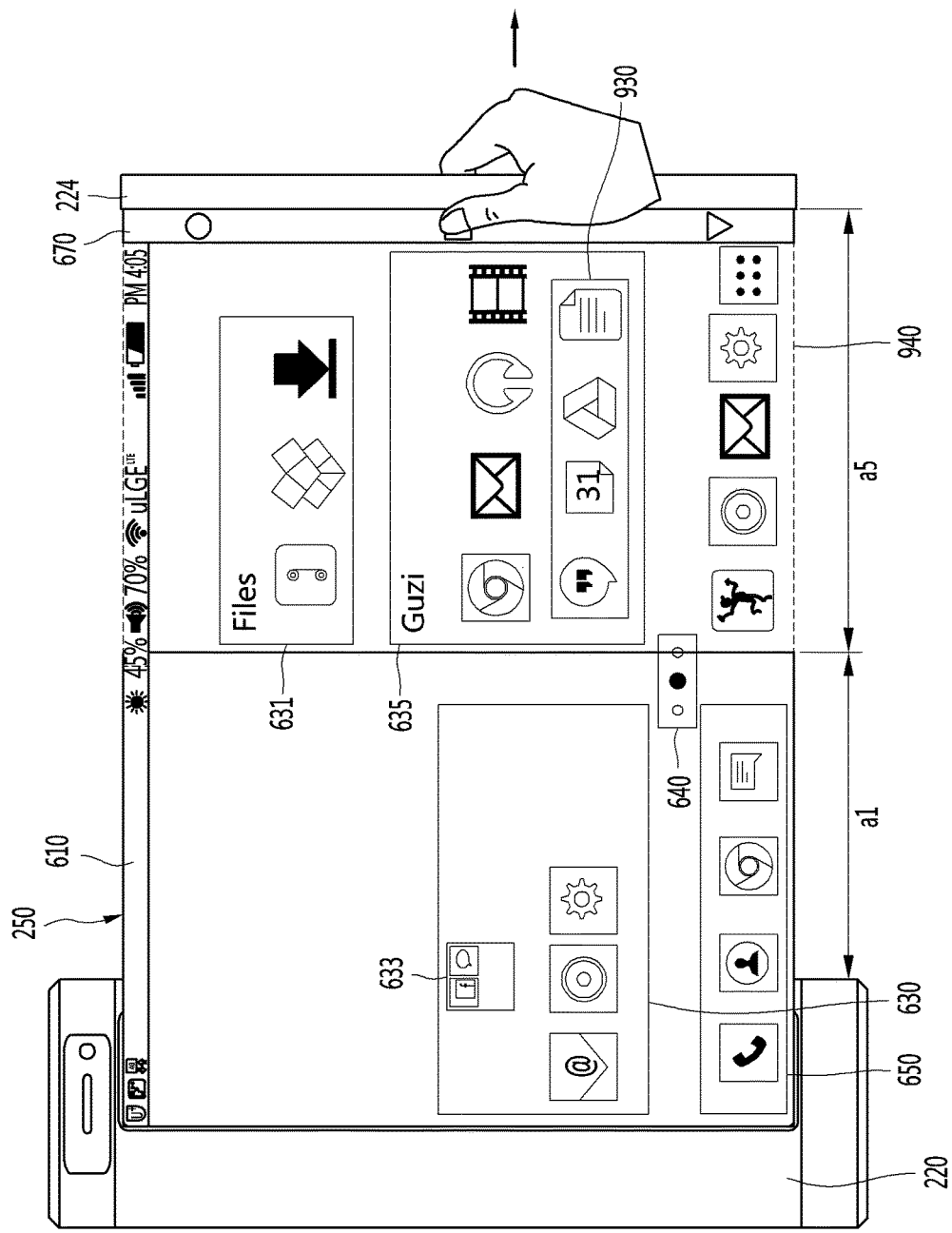

Referring to FIG. 9C, it can be understood that the magnified first folder 631, the magnified third folder 635, and the app icons respectively included in the folders are displayed larger than those of FIG. 9A on a region 940 extended by a distance a5 from the screen of the display unit 250. At the same time, the control unit 290 can display, on the extended region 940, the app icons of the third folders 635 which were not previously displayed. Here, it is assumed that all the app icons included in the first folder 631 were previously displayed.

Figure 9D:
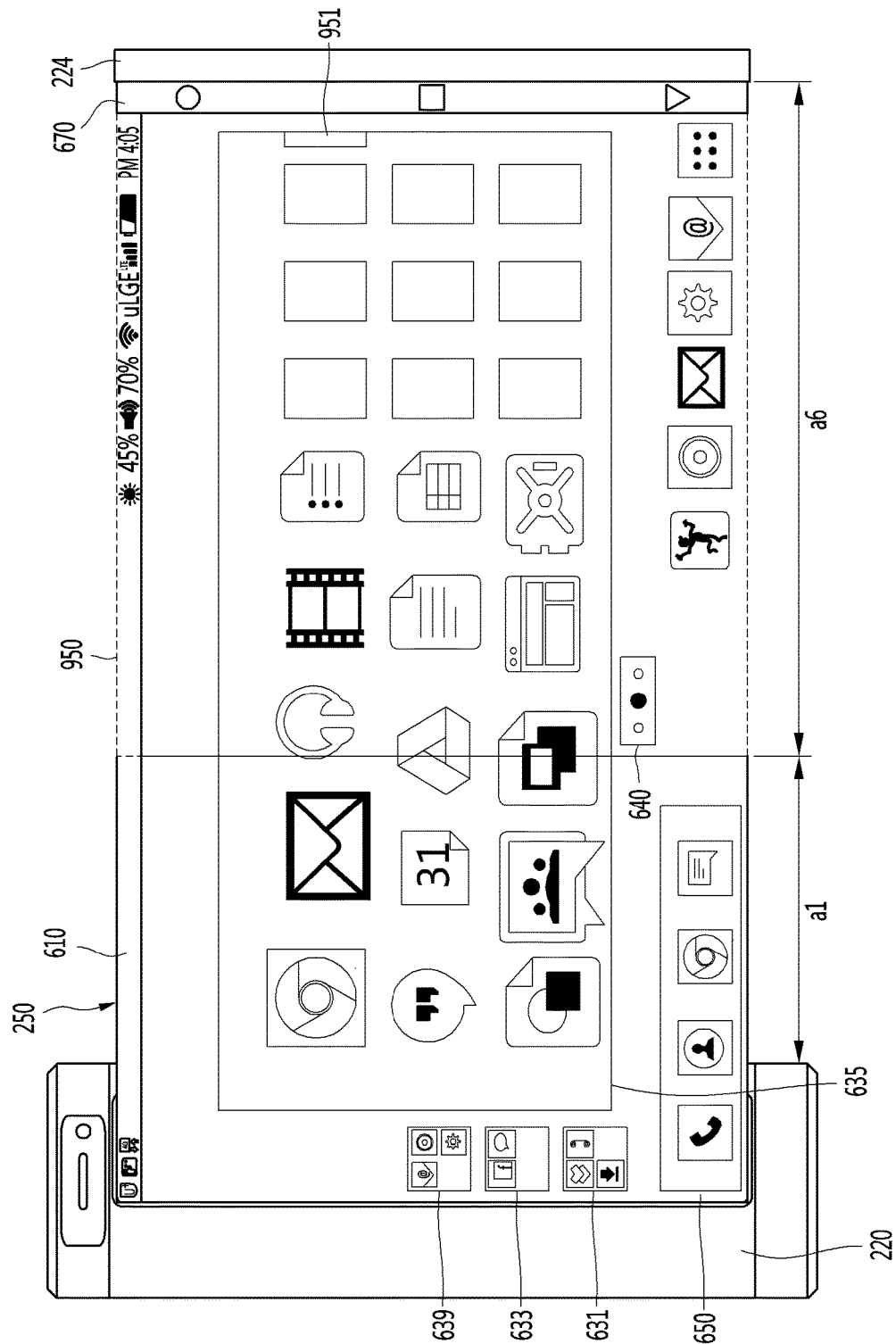

Referring to FIG. 9D, the screen of the display unit 250 can be extended by as much as a region 950 corresponding to a distance a6. It is assumed that the screen of the display unit 250 of FIG. 9D is maximally extended. As the screen is extended by as much as the region 950, the control unit 290 can move the first folder 631 to a pre-extension display area and can change the first folder 631 to its original size. At the same time, the control unit 290 can generate and display a temporary folder 639 which includes app icons included in the application region 630 of FIG. 9C. Furthermore, while enlarging and displaying the third folder 635, the control unit 290 can display on the extended region the app icons of the third folders 635 which were not previously displayed. If there are still app icons included in the third folder 635 but not displayed, the control unit 290 can display a scroll bar 951 at one side of the third folder 635. The user can search for the app icons included in the third folder 635 but not displayed using the scroll bar 951.

Likewise, the extension of a screen by the user can indicate that an app icon desired by the user is not currently displayed. If the screen is further extended in a state in which all the icons included in the first and second folders 631 and 633 are displayed, the control unit 290 can move the first and second folders 631 and 633 to their original positions and can change the first and second folders 631 and 633 to their original sizes, and can display more app icons included in the third folder 635.

According to another embodiment, if a notification is received with respect to an application included in a folder displayed on the home screen, information indicating reception of the notification can be displayed on the folder. In the case where the screen of the display unit 250 is extended, the control unit 290 can indicate, through a badge or other graphic, the application for which a notification is received as the folder in the home screen is opened.

FIGS. 10A to 10G are diagrams illustrating another example in which information included in a home screen is extended as a screen size of a display unit increases.

Figure 10A:
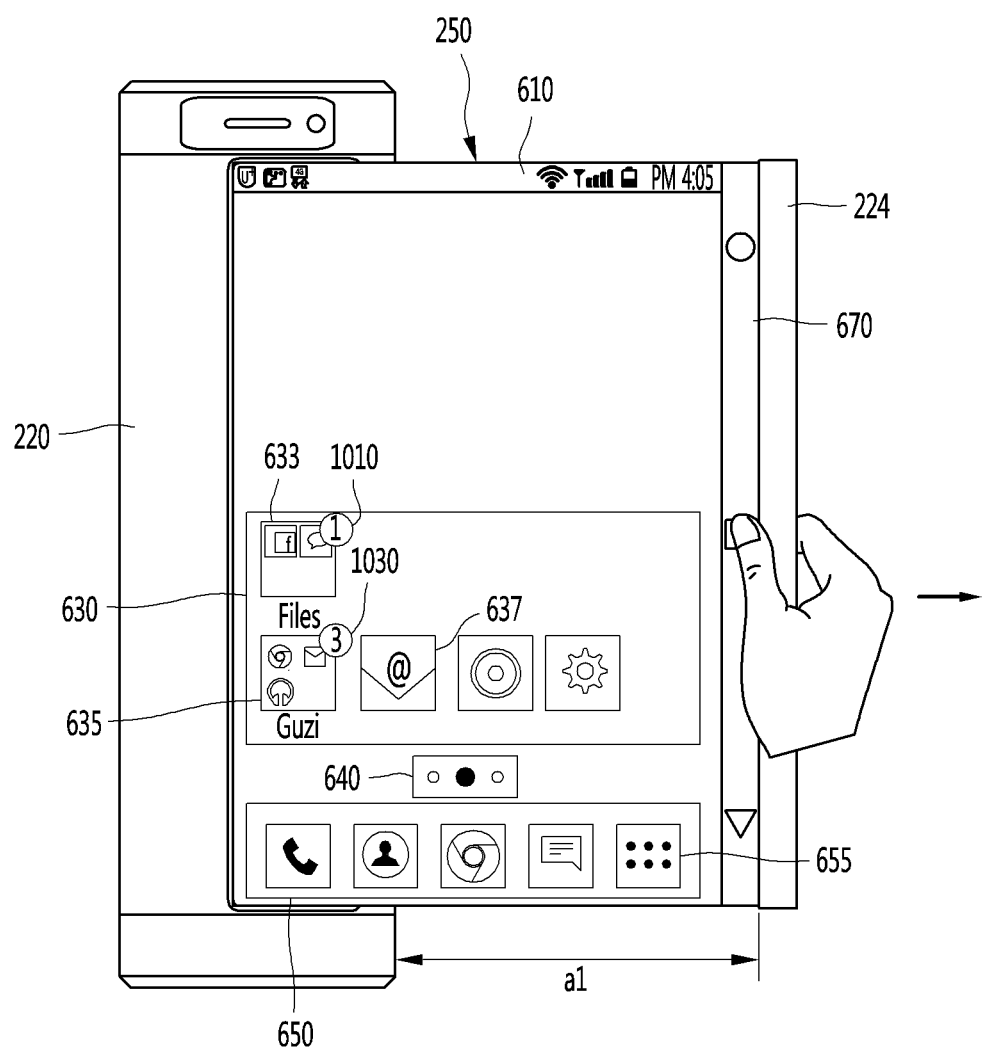

Descriptions of FIG. 10A are based on the descriptions of FIG. 6. FIG. 10A is different from FIG. 6 in that the first folder 631 is not displayed and the widget region 620 is not displayed. Referring to FIG. 10A, a first badge 1010 indicating that one notification has been received with respect to the applications included in the second folder 633 can be displayed on the second folder 633. Furthermore, a second badge 1030 indicating that three notifications have been received with respect to the applications included in the third folder 635 can be displayed on the third folder 635.

In the case where the key input region 670 is selected and the screen of the display unit 250 is extended by as much as the region 710 corresponding to the distance a2, the control unit 290 can extend folders to the extended region 710 on the basis of positions of the folders arranged on the home screen and the number of times applications included in the folders have been executed. Since this operation has been described with reference to FIGS. 7A to 7D, detailed descriptions are not provided below.

Figure 10B:
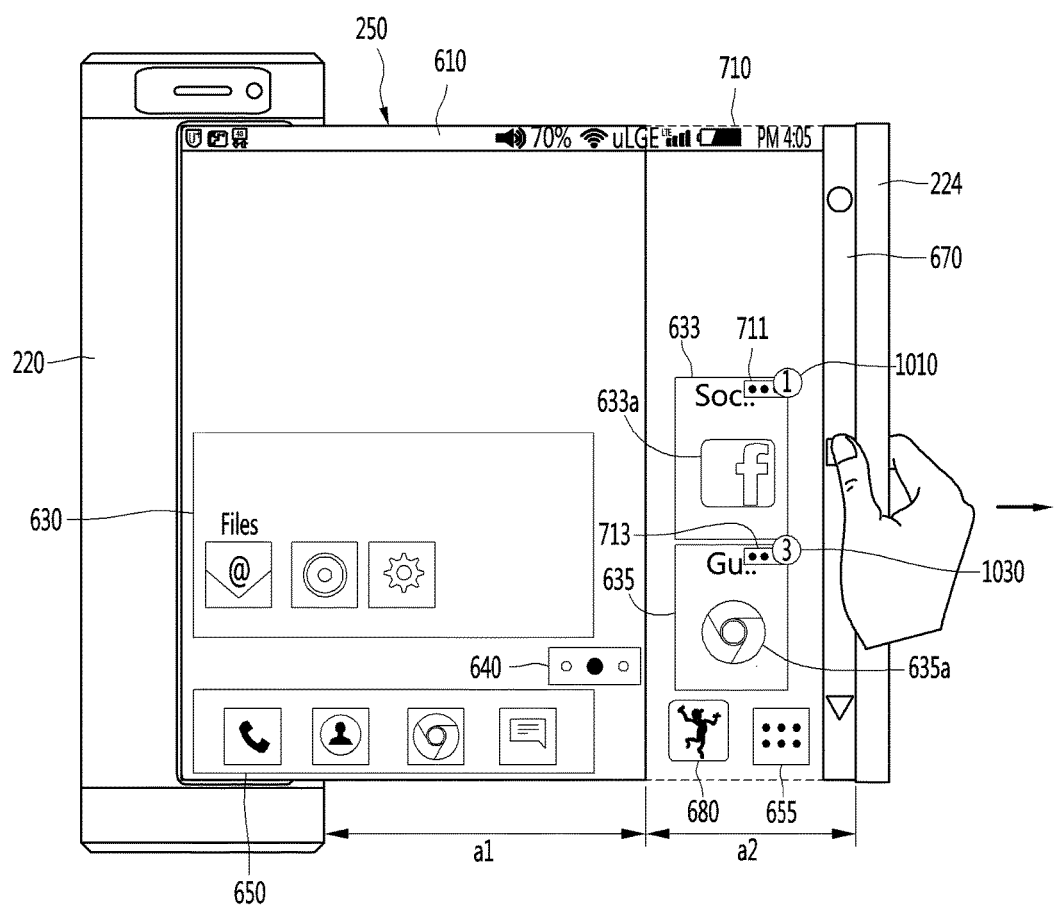

Referring to FIG. 10B, the second and third folders 633 and 635 can be increased in size when moved to the extended region 710. The app icon 633a corresponding to an application most frequently executed during a certain period among the applications included in the second folder 633 can be displayed on the second folder 633. The app icon 635a corresponding to an application most frequently executed during a certain period among the applications included in the third folder 635 can be displayed on the third folder 635. Furthermore, the first badge 1010 can be displayed on the magnified second folder 633, and the second badge 1030 can be displayed on the third folder 635. Each of the first and second badges 1010 and 1030 can be displayed on the indicator 711 indicating that there remain more app icons not displayed. Since the first and second badges 1010 and 1030 are not notifications corresponding to applications corresponding to the app icons 633*a* and 633*b* displayed on the extended region 710, the first and second badges 1010 and 1030 do not disappear. In another embodiment, each of the first and second badges 1010 and 1030 can indicate the number of app icons included in a corresponding folder but not displayed on an extended region.

Figure 10C:
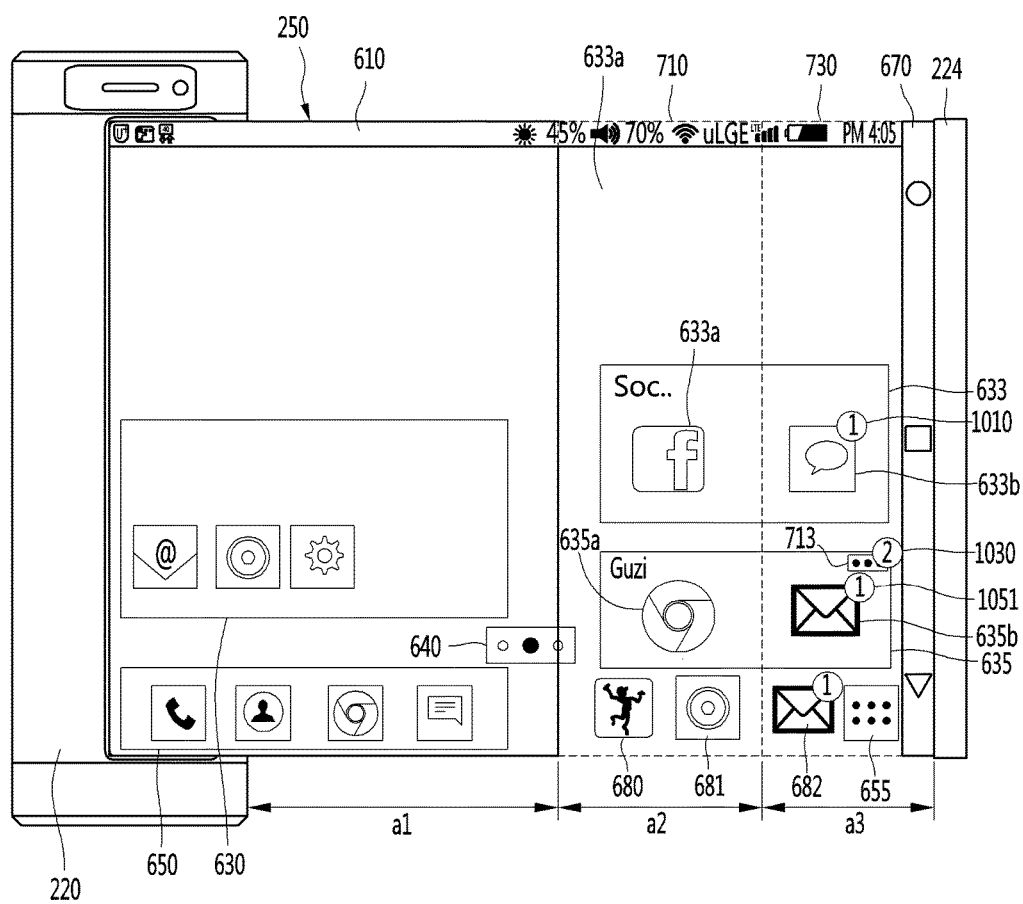

In the case where the screen of the display unit 250 is further extended by as much as the region 730 corresponding to the distance a3 while the key input region 670 is selected, the control unit 290 can display, on the extended region 730, the app icon 633*b* included in the second folder 633 and the app icon 635*b* included in the third folder 635 as illustrated in FIG. 10C. The app icon 633*b* can correspond to an application next most frequently executed after the application of the app icon 633*a*, and the app icon 635*b* can correspond to an application next most frequently executed after the application of the app icon 635*a*. In the case where the first badge 1010 indicates that a notification has been received with respect to the application corresponding to the app icon 633*b*, the control unit 290 can move the first badge 101 displayed on the indicator 711 onto the app icon 633*b*, and can allow the indicator 711 to disappear.

In the case where there is one notification for an application corresponding to the app icon 635*b* among three notifications indicated by the second badge 1030, the control unit 290 can display, on the app icon 635*b*, a badge 1051 indicating that there is one notification, and, at the same time, can change the second badge 1030 displayed on an indicator 713 so that the second badge 1030 indicates that there remain two notifications.

Although it has been described with reference to FIGS. 10A to 10C that, in the case where the screen of the display unit 250 is extended, an app icon corresponding to an application is displayed on an extended region on the basis of a position of a folder included in the home screen and the number of times the application has been executed, an embodiment is not limited thereto. That is, in the case where the screen of the display unit 250 is extended, an app icon corresponding to an application for which a notification has been received can be firstly displayed on the extended region. In another example, an app icon corresponding to an application for which a notification has most recently been received can be firstly displayed. Meanwhile, the badge 1051 which indicates a most recent reception of a notification can differ in color, shape, or the like from other badges 1010.

Figure 10D:
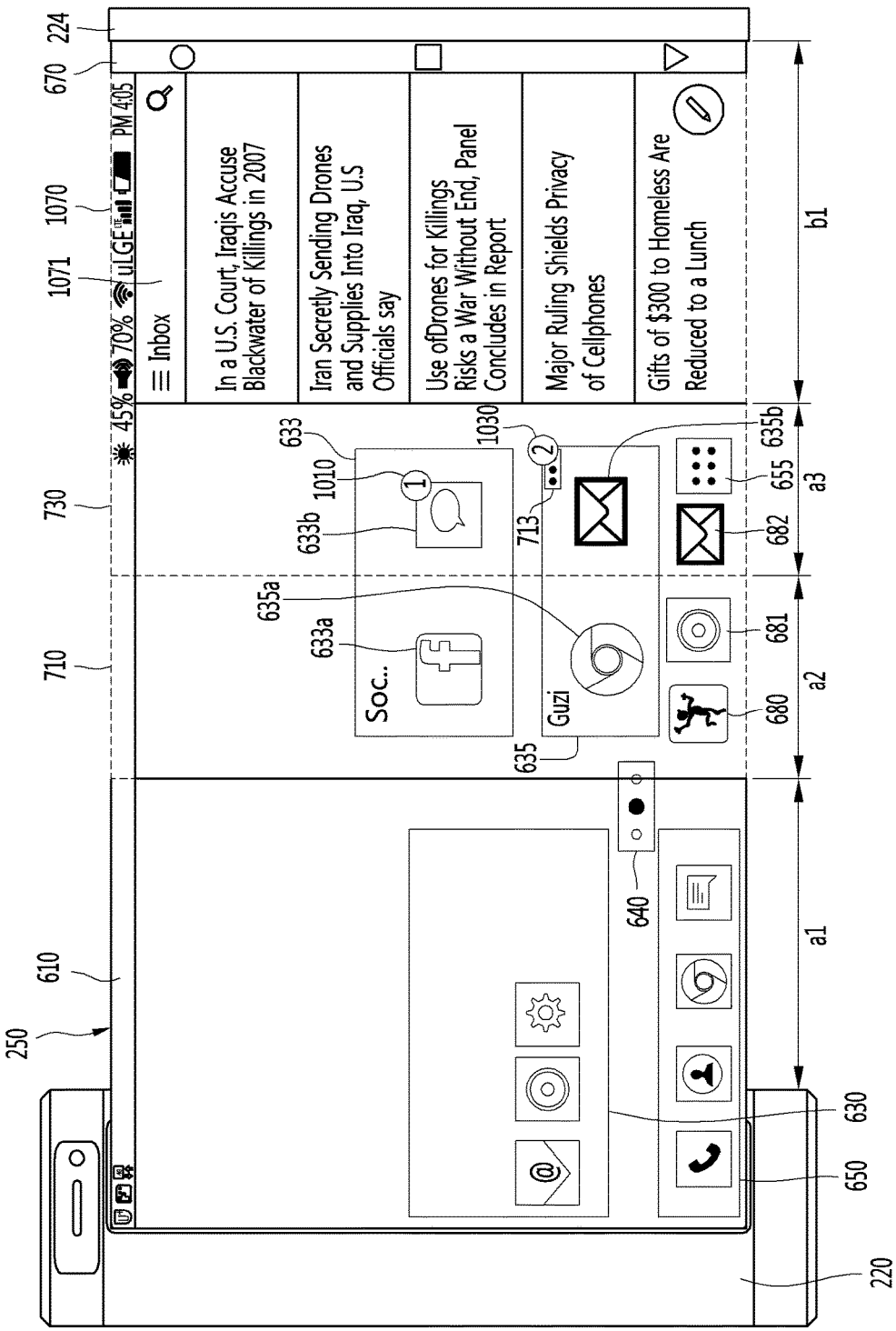

With regard to FIG. 10D, in the case where the screen of the display unit 250 is extended by as much as a region 1070 corresponding to a distance b1 while the key input region 670 is not selected, the control unit 290 can display, on the extended region 1070, an execution screen 1071 of an application for which a notification has most recently been received. For example, in the case where a most recently received notification is relevant to a mail application, the execution screen 1071 of the mail application can be displayed on the extended region 1070. At the same time, the control unit 290 can allow the badge 1051 displayed on the app icon 635*b* corresponding to the mail application to disappear. This is because the notification is considered to have been checked by the user.

Although it has been described with reference to FIG. 10D that the execution screen 1071 of an application for which a notification has most recently been received is displayed on the extended region 1070, an embodiment is not limited thereto. That is, in another embodiment the execution screen of the application corresponding to the app icon 633*b* included in the second folder 633 can be displayed on the extended region 1071.

In one embodiment, the distance b1 can be equal to or longer than a reference distance. In the case where the screen of the display unit 250 is extended by at least the reference distance, the control unit 290 can allow the badge 1051 displayed on the app icon 635*b* to disappear. On the contrary, in the case where the screen of the display unit 250 is extended by a distance less than the reference distance, the control unit 290 can maintain the badge 1051 displayed on the app icon 635*b*

Meanwhile, in the case where the screen is extended by at least the reference distance in FIG. 10D, the execution screen of the application corresponding to the app icon 633*b* can be displayed on the extended region. Therefore, the user can easily check a notification of an application included in a folder as the screen is extended.

Figure 10E:
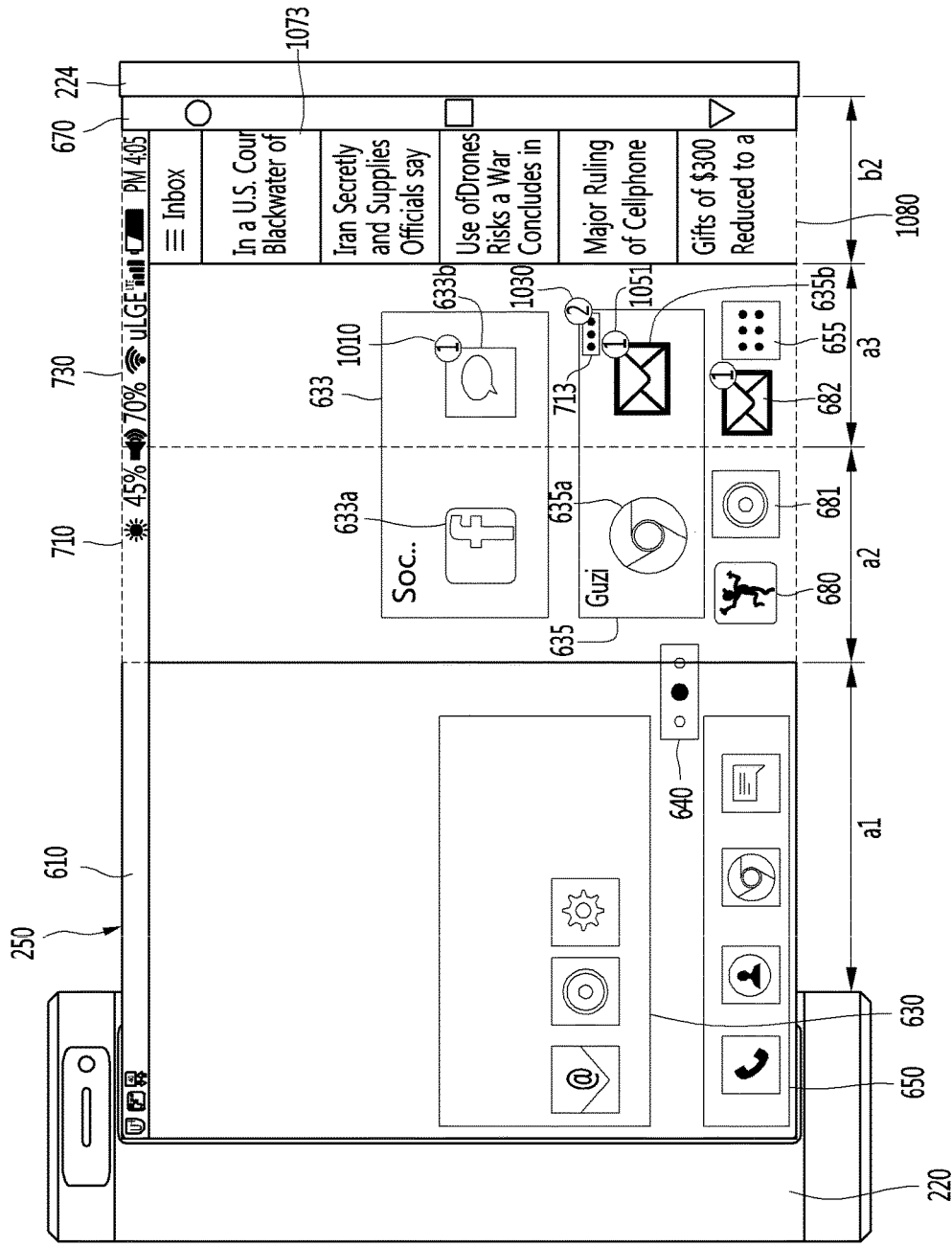

FIG. 10E is a diagram illustrating an interface screen in the case where the screen is extended by a distance less than the reference distance while the key input region 670 is not selected. Referring to FIG. 10E, in the case where the screen is extended by a distance (e.g., a distance b2) less than the reference distance while the key input region 670 is not selected, the control unit 290 can display a part 1073 of the execution screen of the mail application on an extended region 1080. In this case, the control unit 290 can control the display unit 250 so that the display unit 250 continues to display the badge 1051 on the app icon 635*b*. This is because checking the notification is not considered to be desired by the user.

Figure 10F:
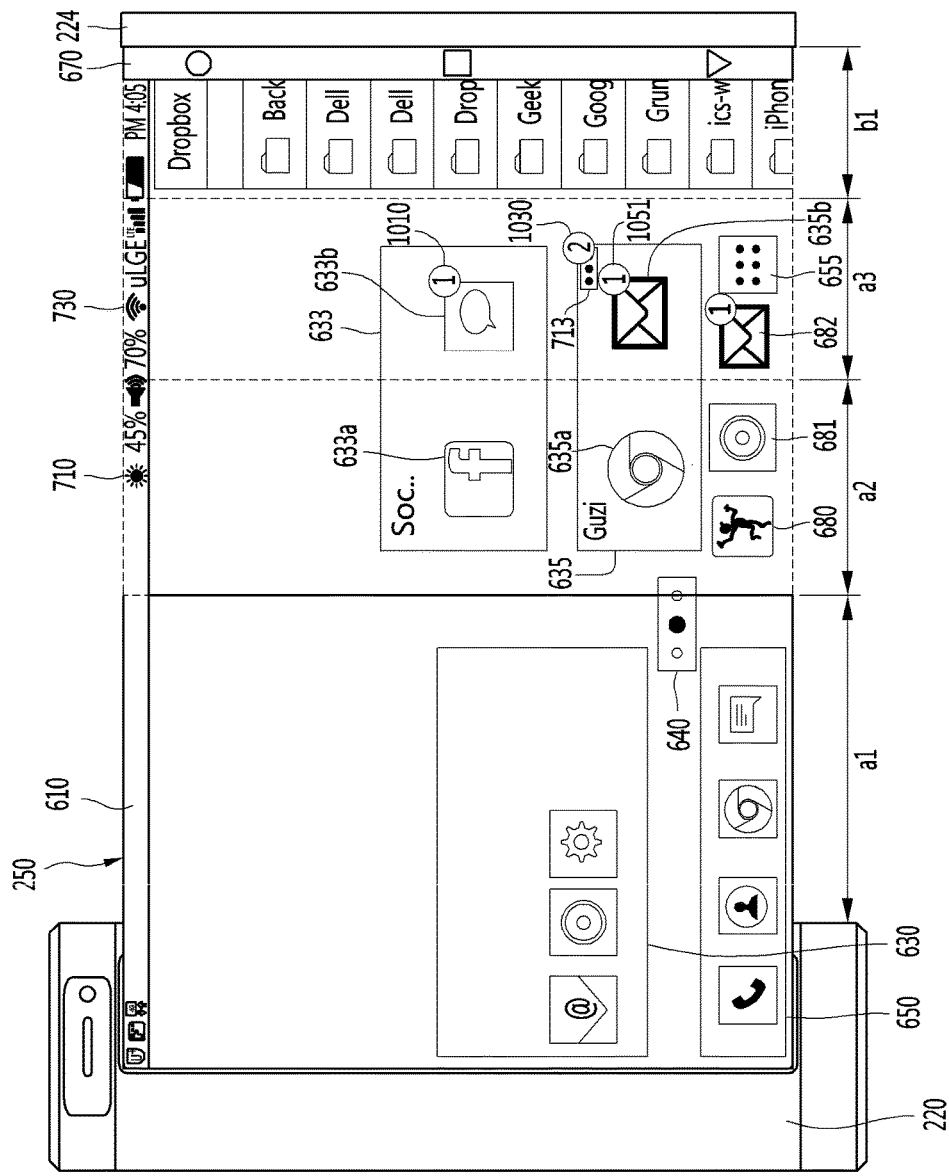

In the case where the screen of the display unit 250 is extended by the distance b2 after being reduced by the distance b2 in FIG. 10E, the control unit 290 can display, on the extended region 1080, a part 1090 of an execution screen of a social network service application corresponding to the app icon 633*b* as illustrated in FIG. 10F.

The user can sequentially check notifications by reducing the screen of the display unit by a distance less than the reference distance and then by extending the screen, using the second holder 224. Meanwhile, in the case where the screen of the display unit 250 is extended by at least the reference distance (e.g., the distance b1), the control unit 290 can display, on the extended region 1070, an execution screen 1091 of the social network service application corresponding to the app icon 633*b* as illustrated in FIG. 10G. At the same time, the control unit 290 can allow the first badge 1010 displayed on the app icon 633*b* to disappear.

According to another embodiment, if an input for extending the screen of the display unit 250 is detected in a state in which the screen is maximally extended, execution screens of applications for which notifications have been received can be sequentially moved and provided.

Figure 11A:
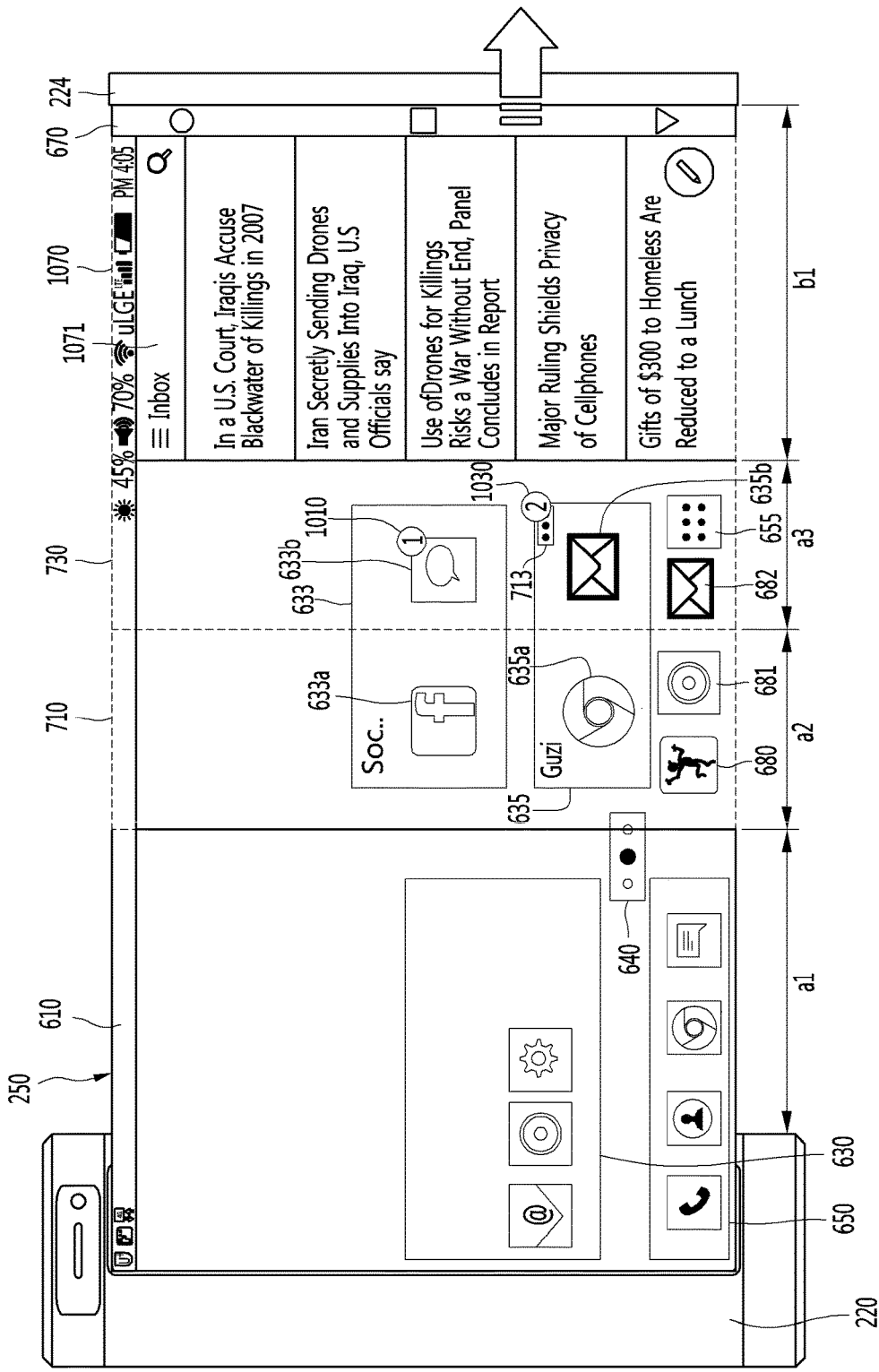
FIGS. 11A and 11B are diagrams illustrating an example of execution screens of applications according to an embodiment of the present disclosure.
Figure 11B:
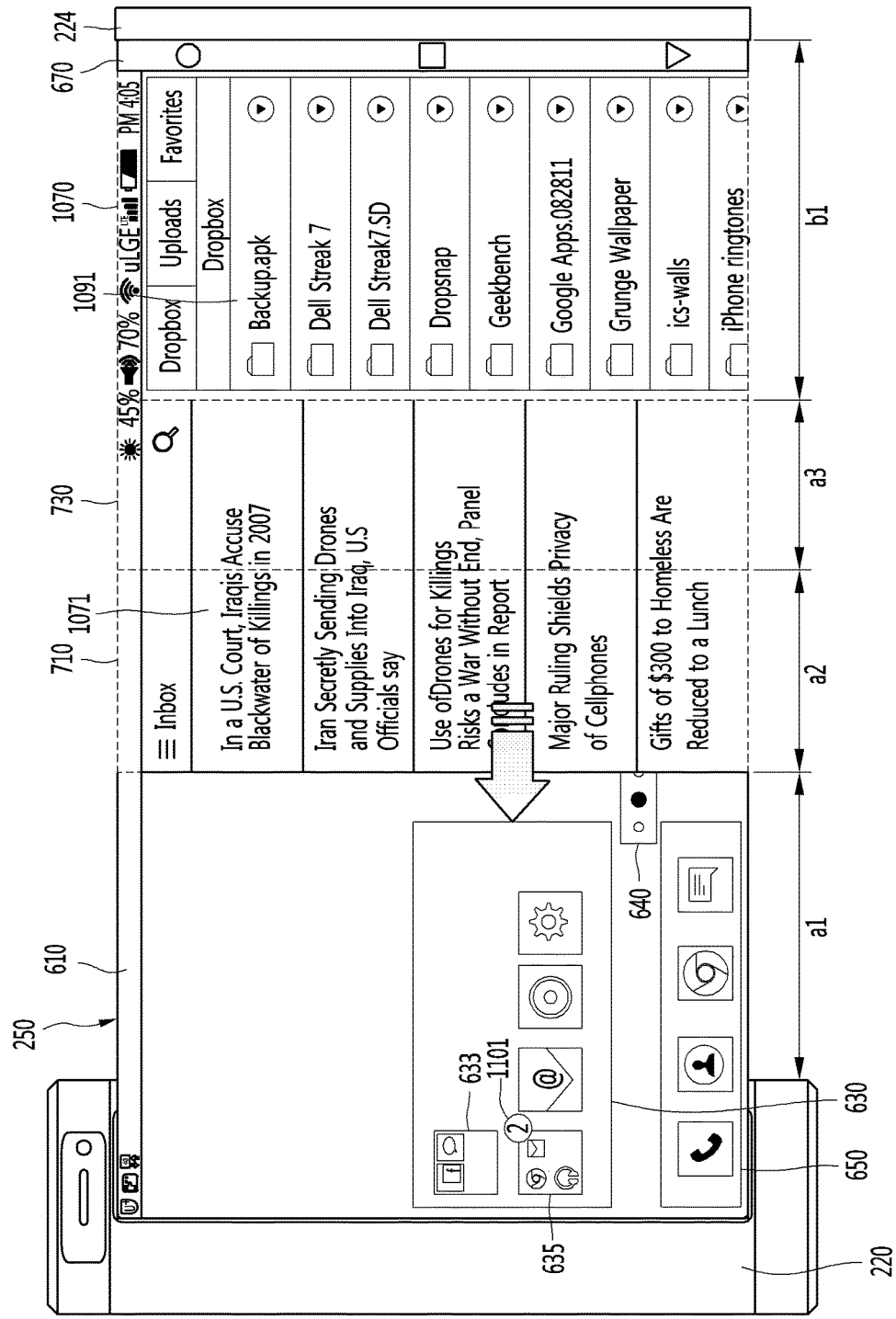

FIGS. 11A and 11B are diagrams illustrating an example in which execution screens of applications for which notifications have been received are sequentially moved and displayed if an input for extending a screen is detected in a state in which the screen is maximally extended.

FIG. 11A is similar to FIG. 10D. However, the screen of the display unit 250 of FIG. 11A is maximally extended. As depicted in FIG. 11B, in the case where an input for extending the screen of the display unit 250 even further is detected, the control unit 290 can move the execution screen 1071 previously displayed on the extended region 1070 to the left, and can display on the region 1070, the execution screen 1091 of the application corresponding to the app icon 633*b* for which a notification has been received but has not been checked yet. At the same time, the control unit 290 can move the second and third folders 633 and 635 previously displayed on the extended regions 710 and 730 to their original location, i.e., the application region 630. Since all notifications for the applications included in the second folder 633 have been checked, the first badge 1010 can disappear, and since there still remain two notifications for the applications included in the third folder 635, a badge 1101 indicating these notifications can be displayed on the third folder 635.

FIGS. 12A to 12D are diagrams illustrating embodiments in which information included in a home screen is extended as a screen is extended in the case where there is a plurality of pages forming the home screen.

Figure 12A:
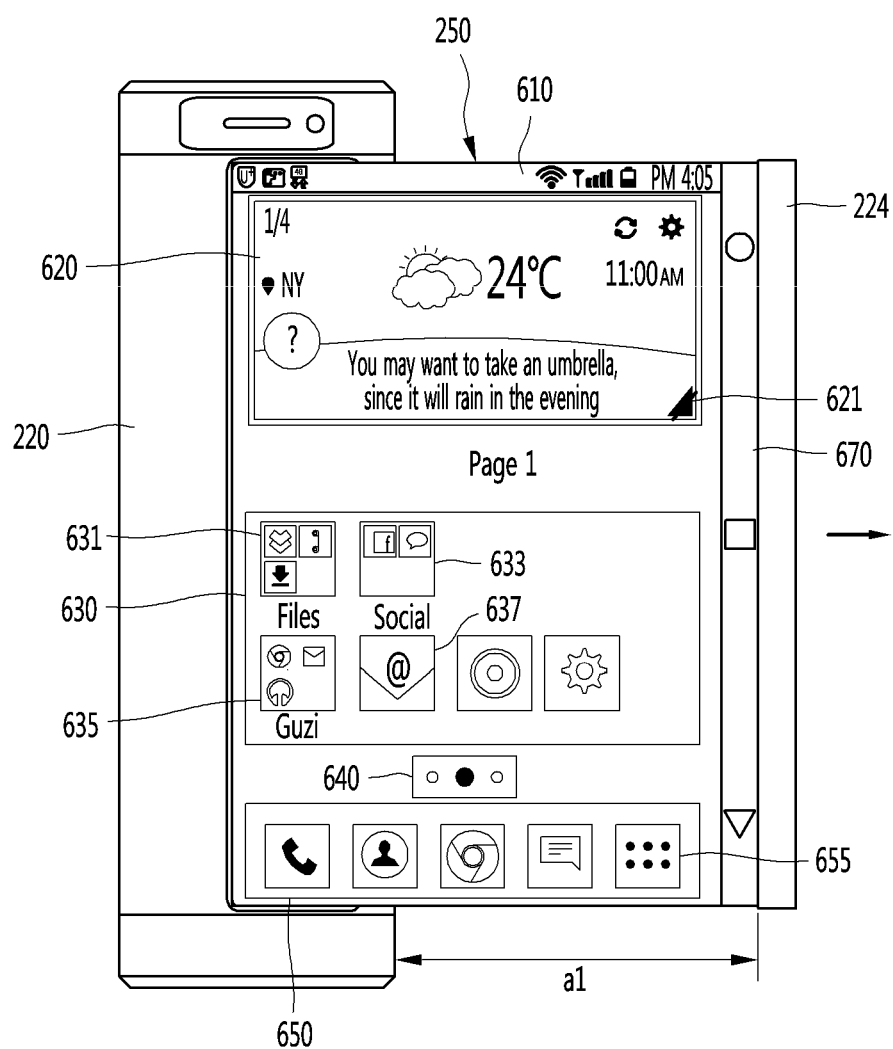
FIGS. 12A, 12B, 12C, and 12D are diagrams illustrating an example of extending information included in a home screen according to an embodiment of the present disclosure.
Figure 12B:
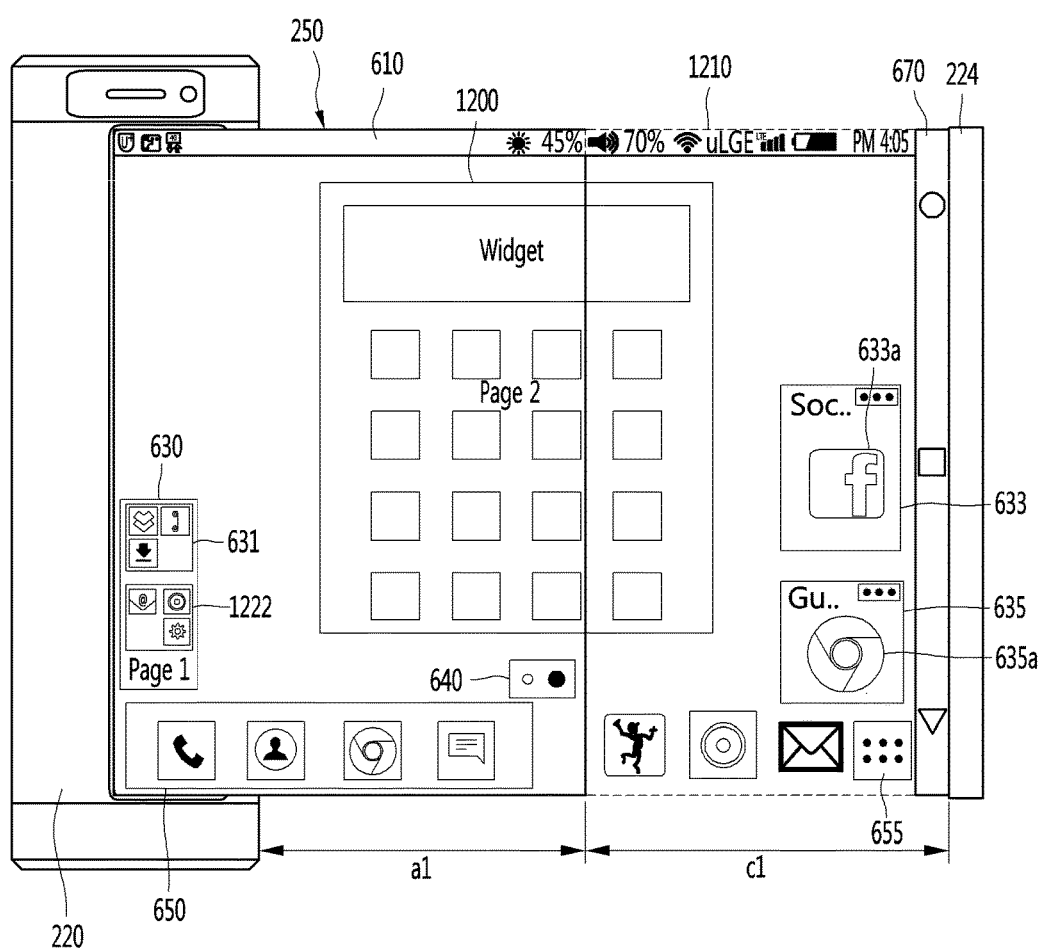

FIG. 12A is similar to FIG. 6. Firstly, the following description is provided with respect to a home screen which includes two pages. It is assumed that the home screen displayed on the screen of the display unit 250 of FIG. 12A has one page. In the case where the screen of the display unit 250 is extended by as much as a region 1210 corresponding to a distance c1, the control unit 290 can display, on the extended screen, a second page 1200 of the home screen, as illustrated in FIG. 12B. The distance c1 can correspond to a distance of a pre-extension screen of the display unit 250. The control unit 290 can display, on the extended screen, the second and third folders 633 and 635 on the basis of the positions of the folders and the number of times applications have been executed. Furthermore, the control unit 290 can generate and display a temporary folder 1222 including app icons included in the first page of the previous home screen. The page indicator region 640 can indicate that a second page is displayed on the extended screen of the display unit 250.

Figure 12C:
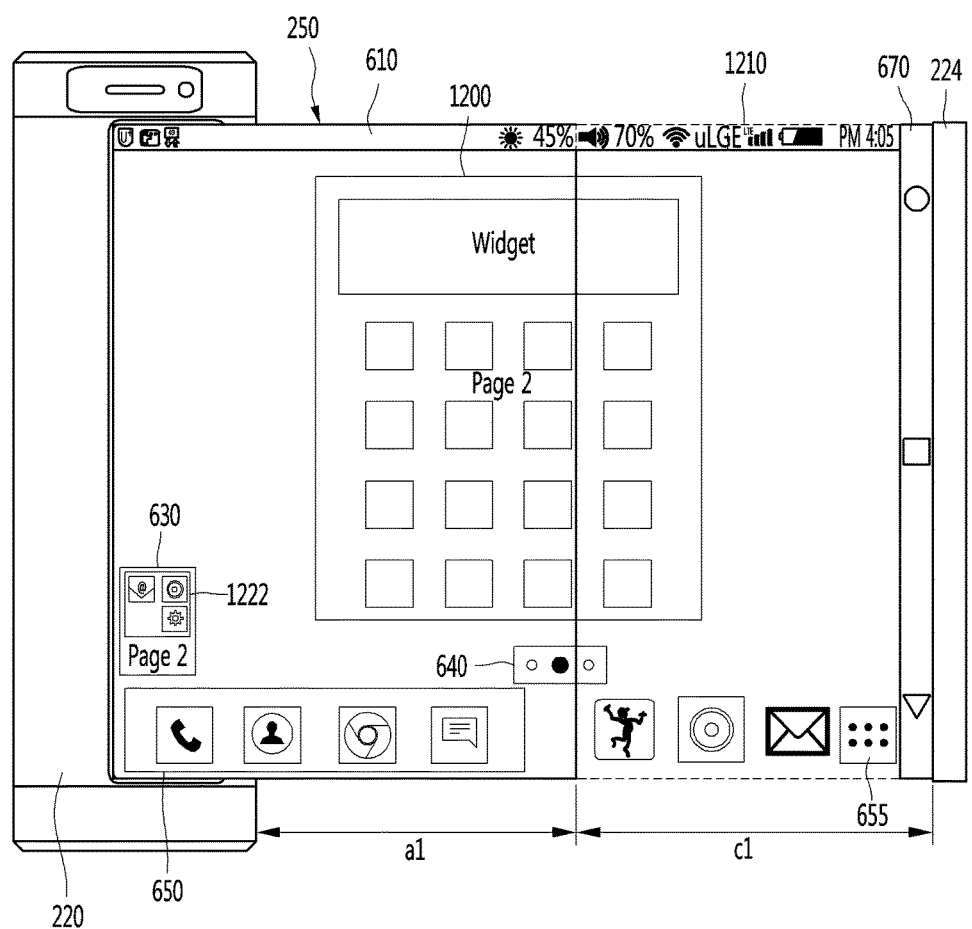
Figure 12D:
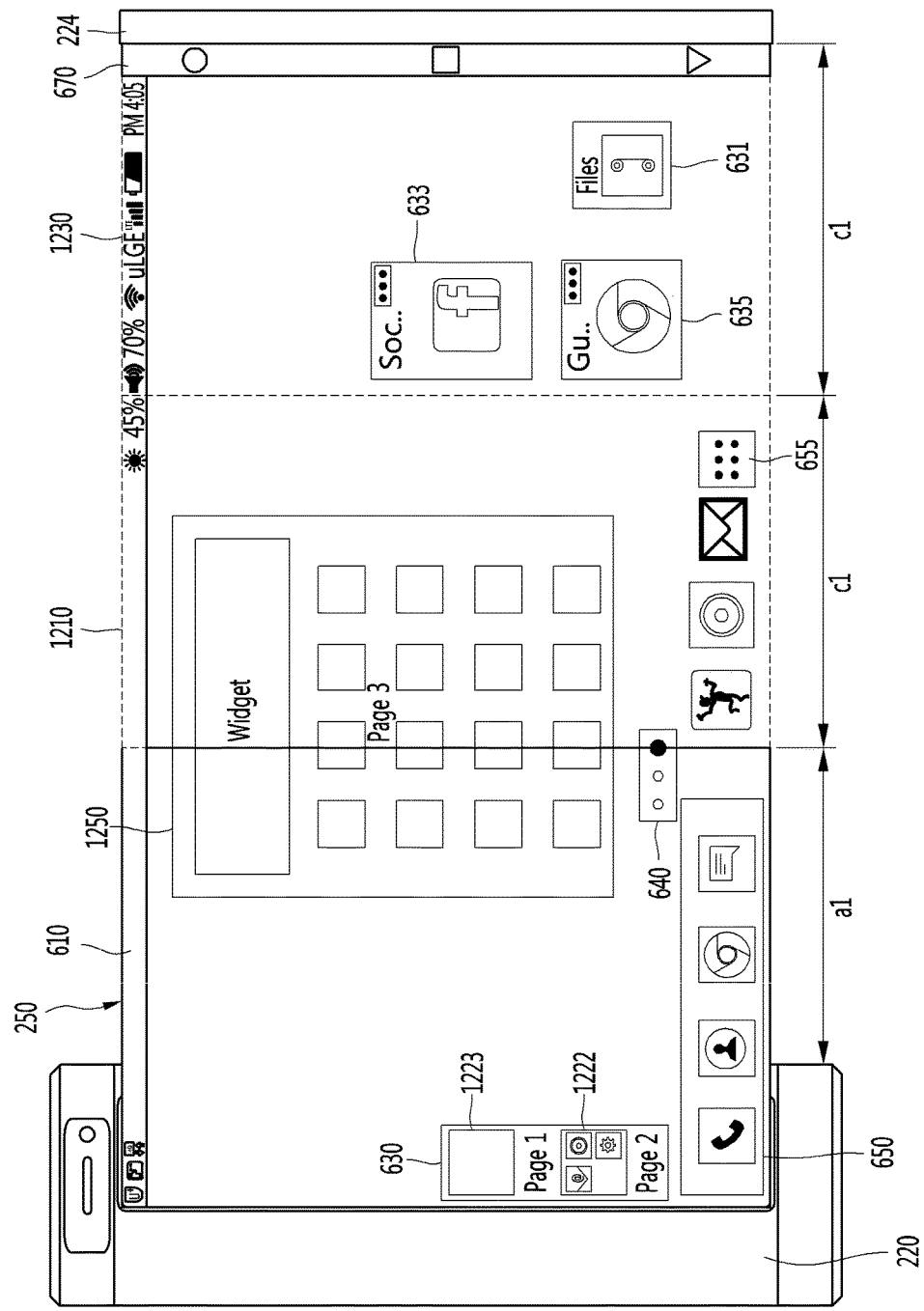

Next, the following description is provided with respect to the case where the home screen includes three pages. With regard to FIG. 12C, in the case where the screen of the display unit 250 is extended by as much as the region 1210 corresponding to the distance c1, the control unit 290 can display, on the extended screen, the second page 1200 of the home screen. FIG. 12C is different from FIG. 12B in that the second and third folders 633 and 635 are not displayed. Furthermore, the second page 1200 can be increased in size. In the case where the screen is further extended by as much as a region 1230 corresponding to the distance c1 in FIG. 12C, the control unit 290 can display, on the extended screen, a third page 1250 as illustrated in FIG. 12D. Furthermore, the control unit 290 can generate a temporary folder 1223 including information on the second page, and can display the temporary folder 1223 on the application region 630. The temporary folder 1223 can include an icon obtained by reducing at least one of a widget and an app icon of the second page. Furthermore, the control unit 290 can enlarge and display, on the extended screen, the folders 631, 633, and 635 included in the first page.

Figure 13A:
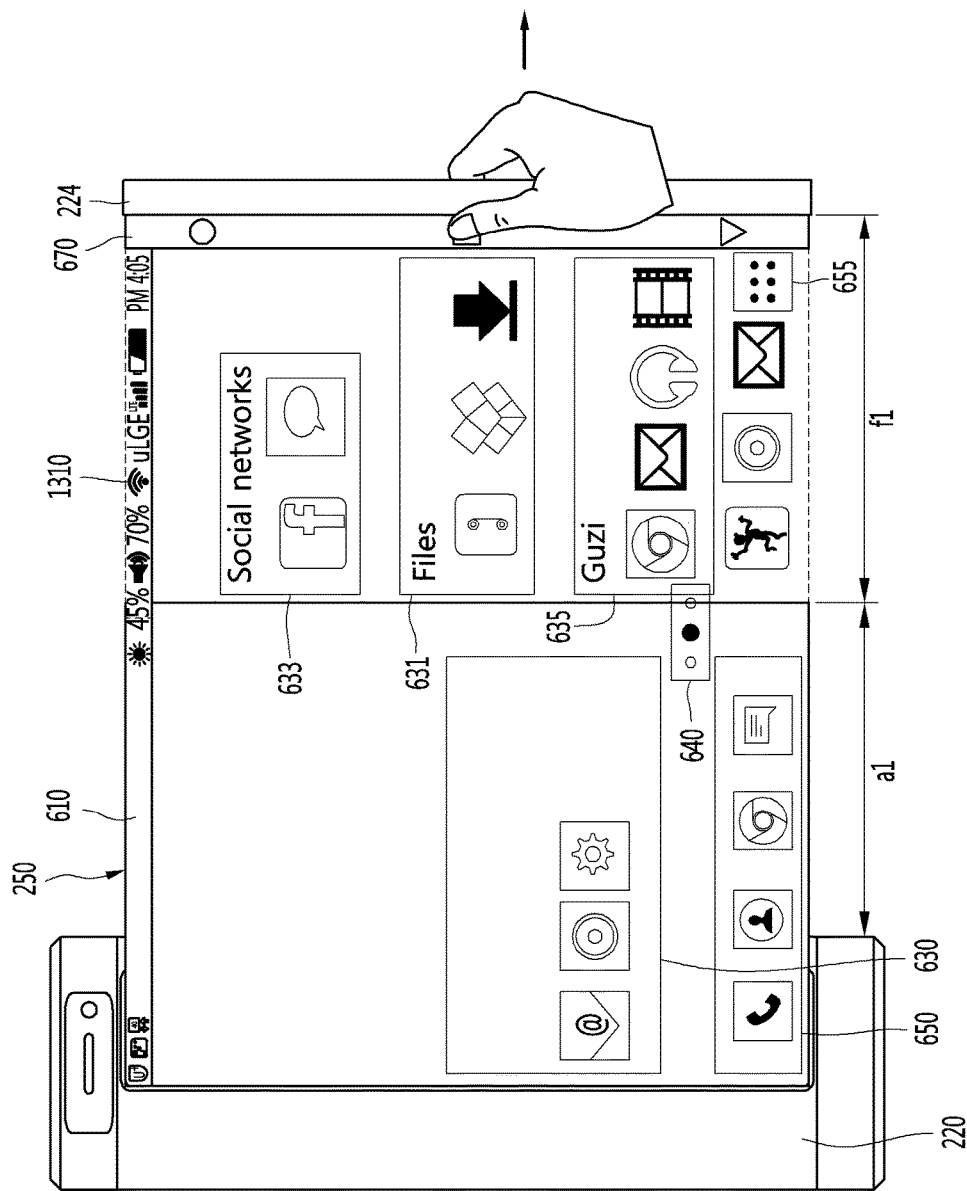
FIGS. 13A and 13B are diagrams illustrating information displayed on a further extended region according to an embodiment of the present disclosure.
Figure 13B:
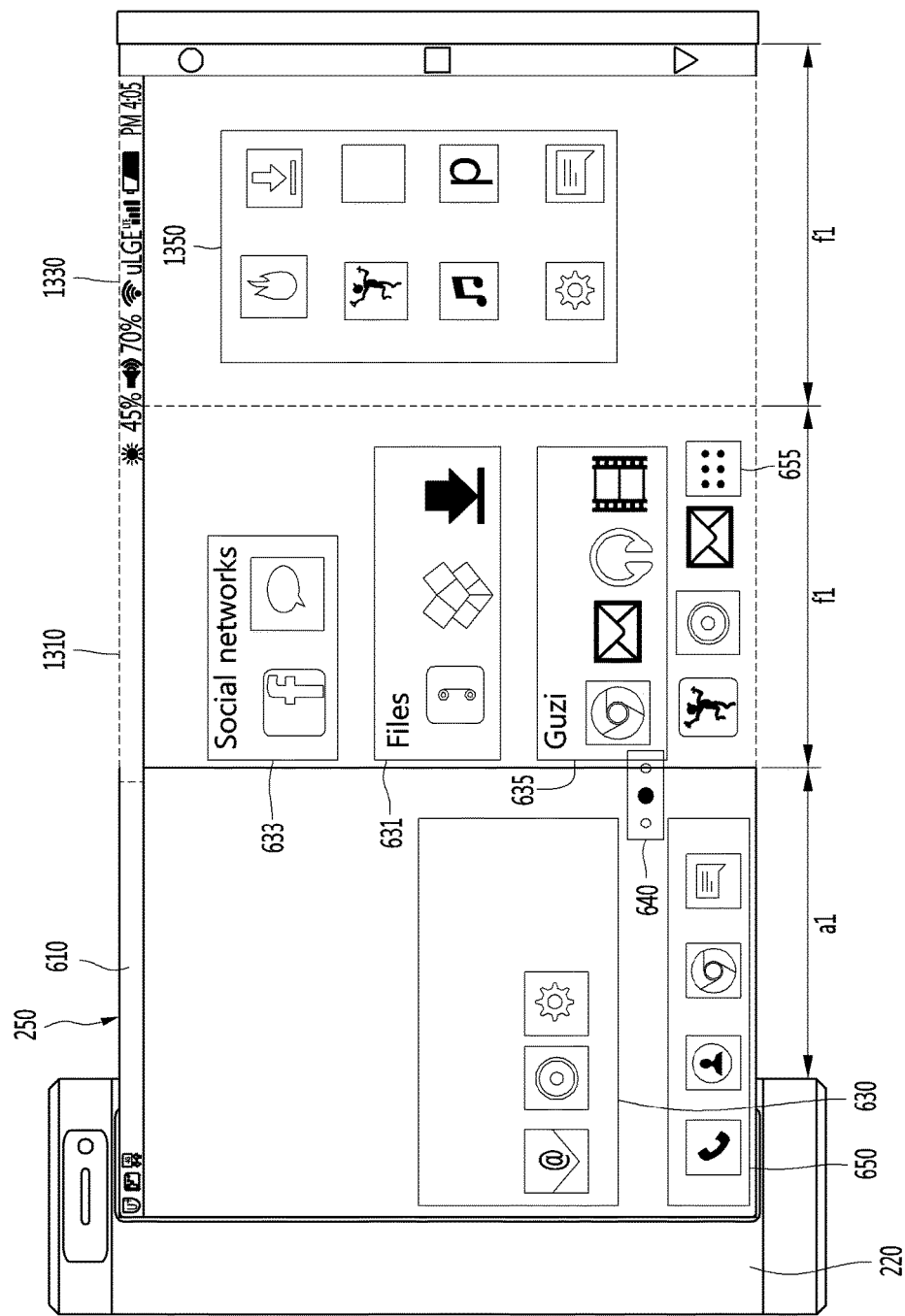

FIGS. 13A and 13B are diagrams illustrating information displayed on a further extended region in the case where all icons within folders included in a home screen are displayed on an extended screen and a screen is further extended according to an embodiment.

Referring to FIG. 13A, the folders 631, 633, and 635 which were displayed on the home screen before extension of a screen can be magnified and displayed on an extended region 1310. In FIG. 13A, it is assumed that all app icons included in each folder are displayed. In the case where the screen is further extended, the control unit 290 can display applications 1350 on an extended region 1330 as illustrated in FIG. 13B. Each application 1350 can be an application that can be accessed according to a command of selecting the see-more icon 655. A distance f1 corresponding to each of the extended regions 1310 and 1330 can be equal to a distance corresponding to the pre-extension home screen. The home screen and the extended regions 1310 and 1330 can be individually controlled. For example, in the case where any one of the applications included in the extended region 1330 is executed, the control unit 290 can add a screen of the executed application to the region 1330.

FIGS. 14A to 14D are diagrams illustrating an example in which, as a screen is extended, information provided through a widget included in a home screen is added.

Figure 14A:
FIGS. 14A, 14B, 14C, and 14D are diagrams illustrating an example of providing information through a widget included in a home screen according to an embodiment of the present disclosure.

In the example of FIGS. 14A to 14D, the widget is a weather widget 1400 for providing information on weather. The weather widget 1400 can be displayed on the widget region 620 illustrated in FIG. 6. Referring to FIG. 14A, the weather widget 1400 can include information on a current time, weather, a current temperature, and a current region. The weather widget 1400 can include an indicator 1401 indicating that there is more information to be provided. The indicator 1401 can indicate that there is more information that can be provided through the weather widget 1400 when the screen is extended.

Figure 14B:
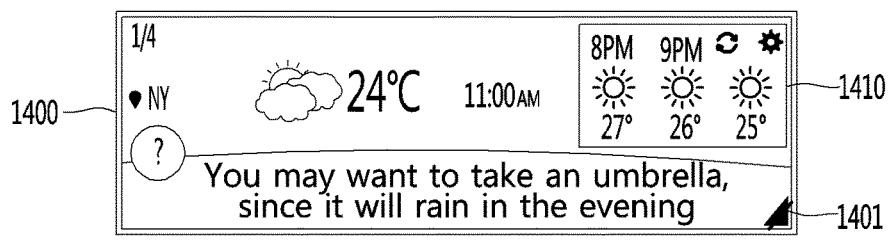

Referring to FIG. 14B, in the case where the screen is extended, the control unit 290 can display hourly weather forecast information 1410 on the extended region.

Figure 14C:
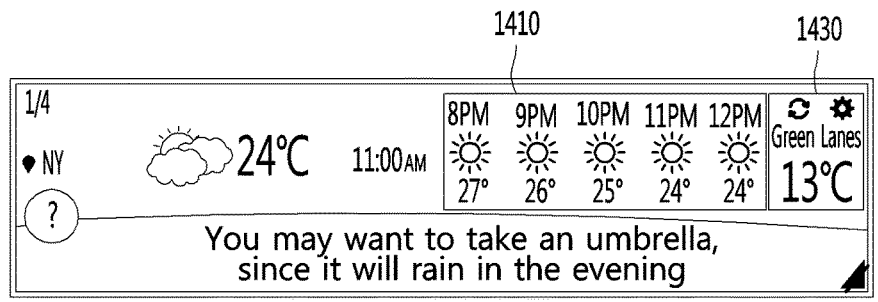

Referring to FIG. 14C, in the case where the screen is further extended, the control unit 290 can display, on the extended region, information 1420 which is a more specific version of the hourly weather forecast information 1410 and current temperature information 1430 of another region.

Figure 14D:
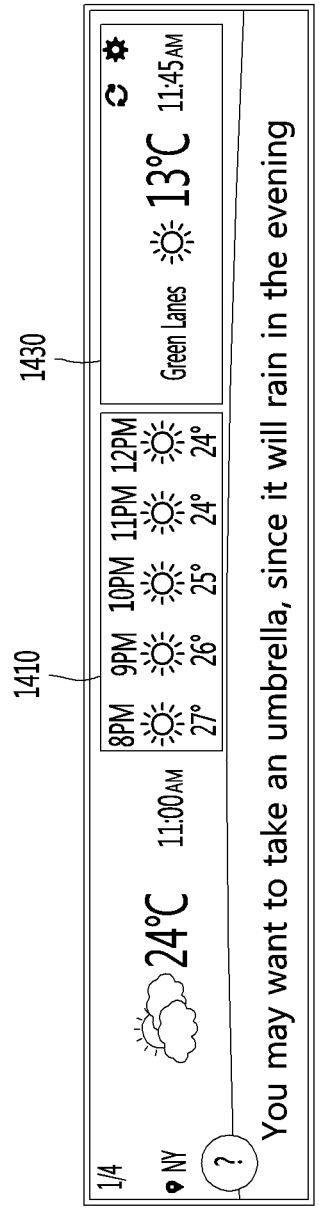

Referring to FIG. 14D, in the case where the screen is further extended, the control unit 290 can display the information 1420 and weather information 1450 of another region. In the case where all the information that can be provided through the weather widget 1400 is displayed on the extended area, the indicator 1401 can disappear.

Figure 15A:
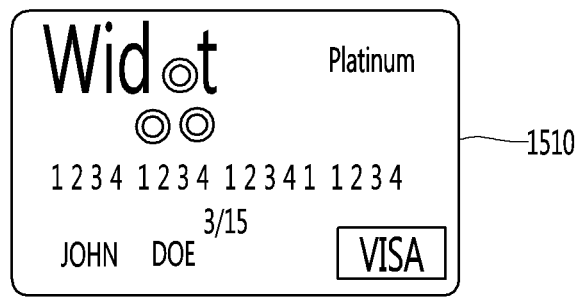
FIGS. 15A and 15B are diagrams illustrating another example of providing information through a widget included in a home screen according to an embodiment of the present disclosure.
Figure 15B:

FIGS. 15A and 15B are diagrams illustrating another example in which, as a screen is extended, information provided through a widget included in a home screen is added.

Referring to FIG. 15A, a card widget 1510 can be displayed on a pre-extension screen of the display unit 250. The card widget 1510 can be used when payment for a product is performed. In the case where the screen is extended, the control unit 290 can display, on the extended region, a barcode 1530 corresponding to the card widget 1510. The user can perform payment for a product or point saving with ease using the barcode 1530.

FIGS. 16A to 16E are diagrams illustrating an example in which, as a screen is extended, information provided through a status bar included in a home screen is added.

Figure 16A:
FIGS. 16A, 16B, 16C, 16D, and 16E are diagrams illustrating another example of providing information through a widget included in a home screen according to an embodiment of the present disclosure.

FIG. 16A illustrates a status bar 1600 displayed on the status bar region 610 of FIG. 6. The status bar 1600 can include device information and notification information. The notification information can be displayed in the form of an icon.

Figure 16B:
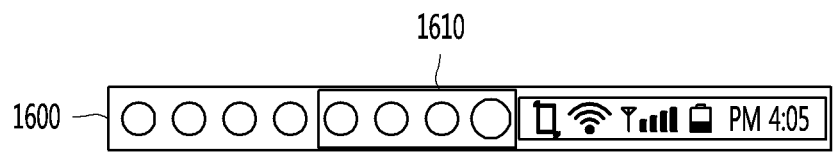

Referring to FIG. 16B, in the case where the screen of the display unit 250 is extended, the control unit 290 can display additional notification information 1610 on the extended screen.

Figure 16C:
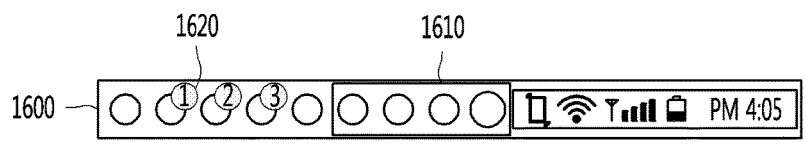

Referring to FIG. 16C, in the case where the screen of the display unit 250 is further extended, the control unit 290 can display, on the extended screen, a notification number 1620 corresponding to each icon included in the notification information.

Figure 16D:
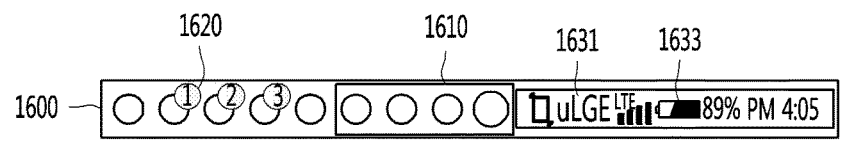

Referring to FIG. 16D, in the case where the screen of the display unit 250 is further extended, the control unit 290 can display specified device information 1631 and 1633 on the extended screen. Wi-Fi information 1631 can include a name of a sharer connected to a device, and battery information 1633 can include a remaining battery capacity.

Figure 16E:
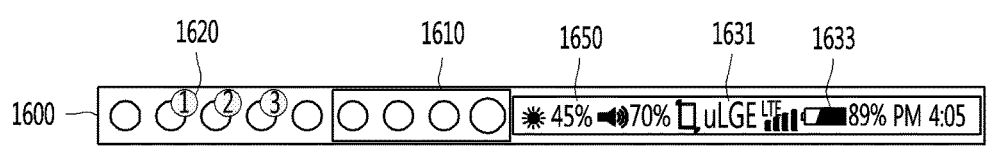

Referring to FIG. 16E, in the case where the screen of the display unit 250 is further extended, the control unit 290 can additionally display information 1650 on a display brightness and a sound output level.

According to various embodiments of the present disclosure, various information can be provided according to a degree of extension of a screen of a display unit so that the needs of a user can be met.

According to various embodiments of the present disclosure, as a screen of a display unit is extended, information included in a home screen is processed in an extended region so that a user can use the information included in the home screen in various ways.

The above-mentioned embodiments can be implemented as computer-readable codes in a program-recorded medium. A computer-readable medium includes any type of a recording device for storing data readably by a computer system. The computer-readable medium includes, for example, a hard disk drive, a solid state disk (SSD), a silicon disk drive (SDD), a ROM, a RAM, a CD-ROM, a magnetic tape, a floppy disk, and an optical data storage device, and can also be implemented in the form of a carrier wave (for example, transmission via the Internet). Furthermore, the above-mentioned computer can include the control unit 180 of the terminal. Therefore, the above description should not be construed as restrictive but should be considered to be merely illustrative. The scope of the present disclosure should be determined through rational interpretation of the accompanying claims, and all modifications within the equivalent scope of the present disclosure fall within the scope of the present disclosure.

What is claimed is:

1. A flexible display device comprising:
   a display extendable from the device;
   a sensor configured to detect an extended amount of the display; and
   a controller configured to:
   display a home screen on an exposed portion of the display, wherein the exposed portion is visible prior to extending of the display;
   display a plurality of folders on the home screen each respectively comprising an application icon corresponding to an application, wherein the plurality of folders are displayed on the exposed portion of the display; and
   detect, via the sensor, extension of the display to expose an additional portion of the display corresponding to a first extended amount;
   compare a total number of times applications included in a first folder of the plurality of folders have been executed during a certain period with a total number of times applications included in a second folder of the plurality of folders have been executed during the certain period,
   determine a folder between the first folder and the second folder to be displayed on an extended home screen portion according to the comparison, and
   move and enlarge the determined folder including the corresponding application icon among the first folder and the second folder to the extended home screen portion,
   wherein the extended home screen portion has a size corresponding to the first extended amount and is displayed on the exposed portion of the display at a side corresponding to a direction in which the display is extended, and
   wherein the home screen is displayed on a remainder of the exposed portion and the additional exposed portion.

2. The flexible display device according to claim 1, wherein the controller is further configured to cause the display to cease displaying the determined folder and the corresponding application icon on the home screen when the enlarged folder and the corresponding application icon are displayed on the extended home screen portion.

3. The flexible display device according to claim 1, wherein the controller is further configured to cause the display to display an animation effect of moving the folder to the extended home screen portion while enlarging the folder as the display is extended.

4. The flexible display device according to claim 1, wherein:
   the home screen comprises the plurality of folders; and
   the controller is further configured to cause the display to:
   display the plurality of folders on the extended home screen portion when the display is extended to a third extended amount; and
   move one of the plurality of folders to the home screen when the display is further extended to a fourth extended amount from the third extended amount.

5. The flexible display device according to claim 1, wherein the controller is further configured to cause the display to display application icons included in one of the plurality of folders as the display is extended to a third extended amount from the second extended amount when only the one of the plurality of folders remains on the extended home screen portion.

6. The flexible display device according to claim 1, wherein the controller is further configured to cause the display to move displayed execution screens of applications that have received notifications to one region of the extended home screen portion where the display is maximally extended.

7. The flexible display device according to claim 1, wherein
   one or more elements of the home screen are displayed to extend across the exposed portion and the extended home screen portion when an input is received to a key input region while the display is being extended.

8. The flexible display device according to claim 1, wherein the controller is further configured to cause the display to display:
   a widget on the home screen comprising information; and
   additional information included in the widget on the extended home screen portion when the display is extended.

9. The flexible display device according to claim 1, wherein the controller is further configured to cause the display to display:

a status bar comprising information related to an operational state of the flexible display device at a first end of the home screen; and additional information included in the status bar on the extended home screen region as the display is extended.

10. A method of controlling a flexible display device, the method comprising:

displaying a home screen on an exposed portion of an extendable display of the flexible display device, wherein the exposed portion is a region of the display that is visible prior to extending of the display;

displaying a plurality of folders each respectively comprising an application icon corresponding to an application, wherein the plurality of folders are displayed on the exposed portion of the display; and detecting extension of the display to expose an additional portion of the display corresponding to a first extended amount;

comparing a total number of times applications included in a first folder of the plurality of folders have been executed during a certain period with a total number of times applications included in a second folder of the plurality of folders have been executed during the certain period, determining a folder between the first folder and the second folder to be displayed on an extended home screen portion according to the comparison, and moving and enlarging the determined folder including the corresponding application icon among the first folder and the second folder to the extended home screen portion, wherein the extended home screen portion has a size corresponding to the first extended amount and is displayed on the exposed portion of the display at a side corresponding to a direction in which the display is extended, and wherein the home screen is displayed on a remainder of the exposed portion and the additional exposed portion.

11. The method of claim 10, wherein:

the home screen comprises the first folder and the second folder arranged in a first row and a third folder arranged in a second row; and the method further comprises displaying:

a first extended folder comprising an application icon corresponding to an application most frequently executed during a particular time period among the applications of the first and second folders, wherein the first extended folder is displayed in a first row of the extended home screen portion;

a second extended folder and an application icon corresponding to an application most frequently executed during the particular time period among applications of the third folder, wherein the second extended folder is displayed in a second row of the extended home screen portion.

12. The method of claim 10, further comprising ceasing display of the determined folder and the corresponding application icon on the home screen when the enlarged folder and the corresponding application icon are displayed on the extended home screen portion.

* * * * *